United States Patent [19]
Cotter et al.

[11] Patent Number: 6,069,720
[45] Date of Patent: May 30, 2000

[54] OPTICAL TELECOMMUNICATIONS NETWORK

[75] Inventors: David Cotter, Woodbridge; Martin C. Tatham, Ipswich, both of United Kingdom

[73] Assignee: British Telecommunications public limited company, London, United Kingdom

[21] Appl. No.: 09/289,626

[22] Filed: Apr. 12, 1999

Related U.S. Application Data

[62] Division of application No. 08/737,913, filed as application No. PCT/GB95/01176, May 23, 1995, Pat. No. 5,912,753.

[30]    Foreign Application Priority Data

| May 23, 1994 | [GB] | United Kingdom | .................... | 9410311 |
| Jun. 28, 1994 | [GB] | United Kingdom | .................... | 9412956 |
| Aug. 15, 1994 | [EP] | European Pat. Off. | .............. | 94306015 |
| Sep. 28, 1994 | [GB] | United Kingdom | .................... | 9419679 |
| Nov. 18, 1994 | [EP] | European Pat. Off. | .............. | 94308523 |
| Nov. 21, 1994 | [EP] | European Pat. Off. | .............. | 94308568 |

[51] Int. Cl.$^7$ .................................................. H04J 14/08
[52] U.S. Cl. .......................... 359/137; 359/123; 370/392
[58] Field of Search ................................. 359/118, 123, 359/137; 370/392, 352, 354, 355

[56]    References Cited

U.S. PATENT DOCUMENTS

| 5,734,486 | 3/1998 | Guillemot et al. ....................... | 359/139 |
| 5,790,288 | 8/1998 | Jager et al. .............................. | 359/123 |

FOREIGN PATENT DOCUMENTS

| 0 526 717 | 2/1993 | European Pat. Off. . |
| 0 547 836 | 6/1993 | European Pat. Off. . |
| WO 90/05419 | 5/1990 | WIPO . |

OTHER PUBLICATIONS

Bononi, A. et al., A. et al., "Design and Channel Constraint Analysis . . . ", Journal of Lightwave Technology, vol. 11, No. 12, Dec. 1993, pp. 2166–2176.

Forghieri, F. et al., "Novel Packet Architecture for All–Optical . . . ", Electronics Letters, vol. 28, No. 25, Dec. 3, 1992, pp. 2289–2291.

Kawanishi, S. et al., "64 to 8Gbits/s All Optical . . . ", Electronics Letters, vol. 29, No. 1, Jan. 21, 1993, pp. 231–233.

Ogoni, N., "Photonic Lattice–Type Self–Routing . . . ", Electronics and Communications in Japan, Part, 1, vol. 75, No. 8, Aug. 1992, pp. 26–40.

Prucnal, P.R. et al., "Self–Routing Photonic Switching with Optically Processed Control", Optical Engineering, vol. 29, No. 3, Mar. 1990, pp. 170–182.

Prucnal, P.R. et al., "Optically–Processed Routing for Fast Packet Switching", Lightwave Communication Systems, vol. 1, No. 2, May 1990, pp. 54–67.

Sauer, J., et al., "A Soliton Ring Network", Journal of Lightwave Technology, vol. 11, No. 12, Dec. 1993, pp. 2182–2190.

Takahashi, Y. et al., "New Retiming and Synchronisation . . . ", Electronics Letters, vol. 26, No. 2, Jan. 18, 1990, pp. 99–100.

(List continued on next page.)

*Primary Examiner*—Kinfe-Michael Negash
*Attorney, Agent, or Firm*—Nixon & Vanderhye P.C.

[57]    ABSTRACT

A packet carried on an optical network is routed by carrying out a logic operation on an address word carried in a packet header and a predetermined discriminator word. A routing decision is made in accordance with the result of the logic operation. The logic operation may be a bit-wise Boolean AND operation. An additional logic operation may be carried out with an additional discriminator word to determine whether the packet is destined for a remote region of the network. In this case, the packet may be steered directly to the remote region.

2 Claims, 26 Drawing Sheets

OTHER PUBLICATIONS

Zhang, J–G, "Architecture for Self–Clocked Self–Routing Photonic Bit Switching", Proceedings, IEEE Lasers an Electro–Optics Society 1993 Annual Meeting, Nov. 15–18, 1993, pp. 399–400.

Prucnal et al., "Self–Routing Photonic Switching With Optically Processed Control", Optical Engineering. pp. 170–182, Mar. 29, 1990.

Zhang, "Architecture for Self–Clocked Self–Routing Photonic Bit Switching ", Proceedings, IEEE Lasers and Electro–Optics Society 1993 Annual Meeting. pp. 399–400, Nov. 1993.

Prucnal et al., "Optically–Processed Routing for Fast Packet Switching", Lightwave Communication Systems, vol. 1, No. 2, pp. 54–67, May 1990.

Fig. 6A
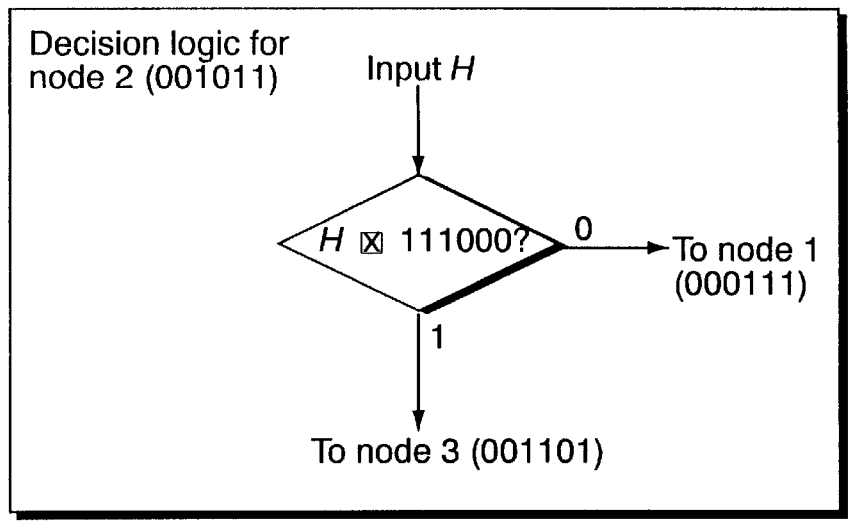
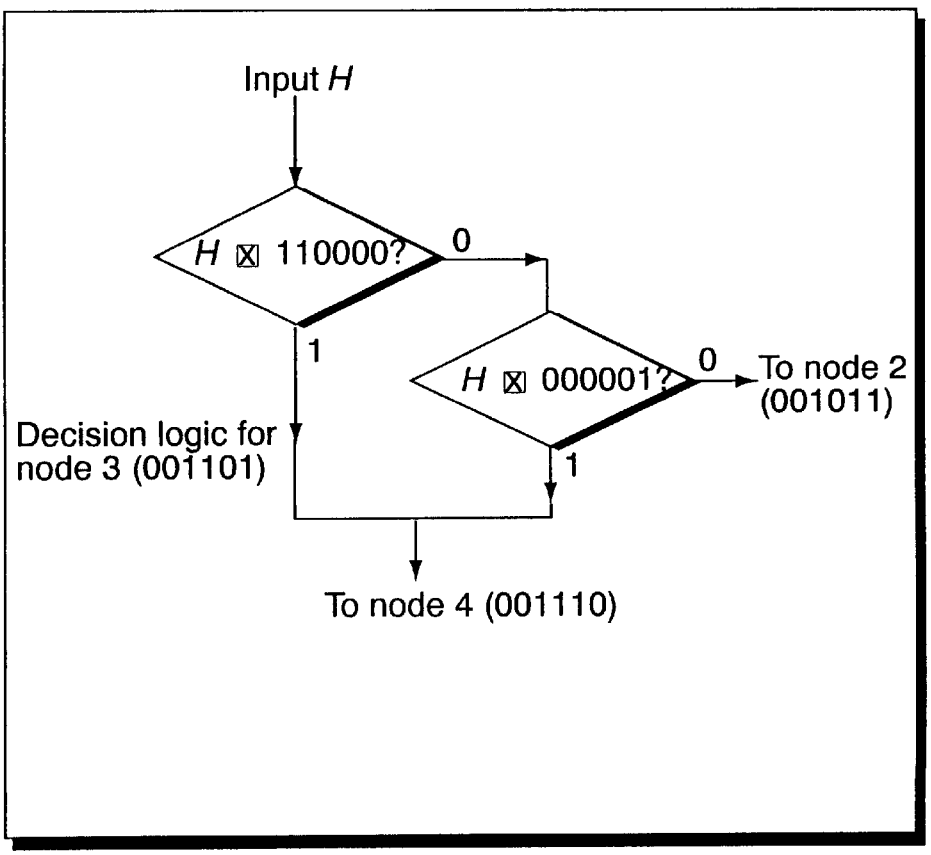
Fig. 6B

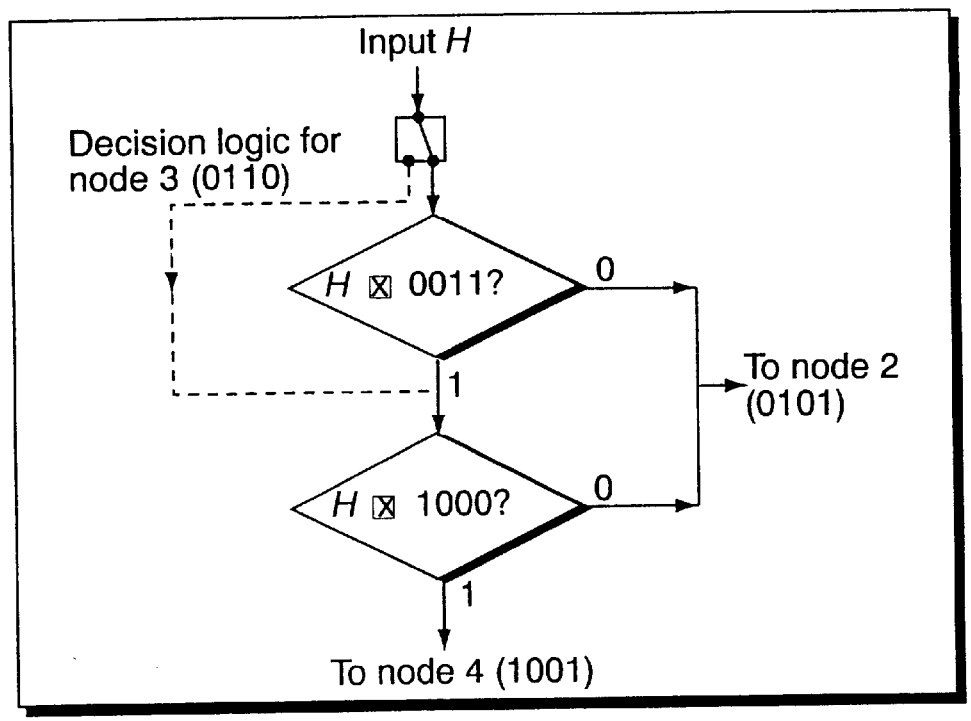
Fig. 12
Fig. 13
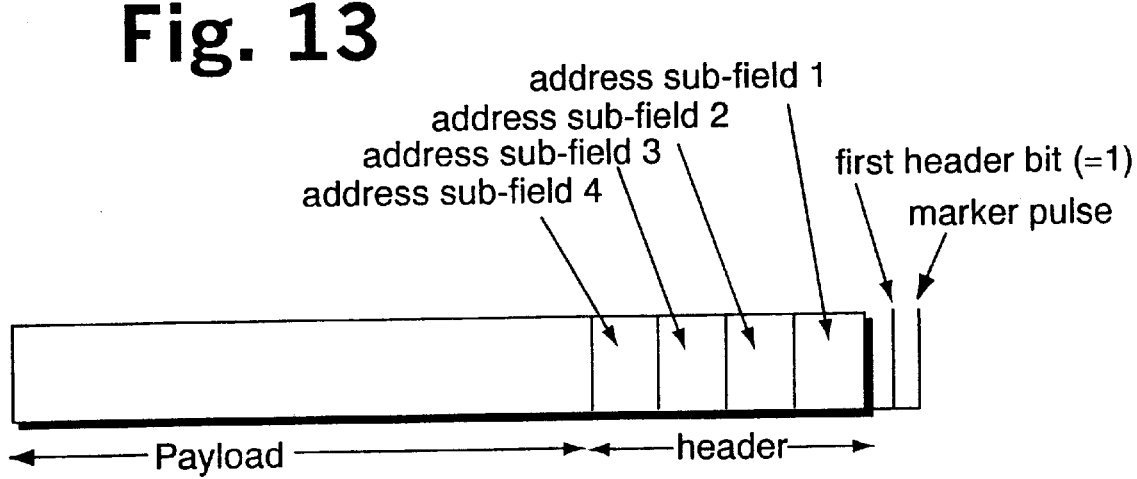

OPTICAL TELECOMMUNICATIONS NETWORK

This application is a divisional of Application Ser. No. 08/737,913, filed Dec. 30, 1996, now U.S. Pat. No. 5,912,753, which is itself the national stage of PCT/GB95/01176, filed on May 23, 1995.

BACKGROUND TO THE INVENTION

The present invention relates to an optical telecommunications network, and a method of routing packets carried on such a network.

Conventionally, telecommunications networks, whether based on copper wires or optical fibres, have been organised on the basis of the provision of circuits between customers—either semi-permanent "private" circuits or temporary "dial-up" circuits. Until recently, the traffic carried by such circuits comprised primarily voice telephony together with some low-speed data traffic. Although the replacement of copper fibre networks with optical fibres has provided higher transmission bandwidths and opened the way to the use of the network for high data-rate transmissions and services such as video telephony, hitherto network resources have been allocated to such services still on the basis of circuit provisions. However this approach becomes increasingly inadequate in terms of efficiency of use of the available bandwidth, and network load management, as the traffic carried becomes increasingly bursty, wide-ranging and rapidly fluctuating in bandwidth requirement, with widely diverse message destinations and low predictability. In particular, under these conditions, it becomes increasingly difficult to manage centrally the allocation of specific transmission routes to respective circuit connections.

The paper by Bononi et al. published at pp 2166–2176, Journal of Lightwave Technology, Vol. 11, No. 12, December 1993 discloses a method of routing packets on an optical network based on header recognition. The header of an incoming packet is demultiplexed using an optical AND gate and converted into the electrical domain by photodetectors. The header is then processed in the electrical domain and a routing decision made based on recognition of the address carried in the header. Since this operation is carried out in the electrical domain and involves complex logical operations on lengthy multi-bit addresses, the switching operation is necessarily slow, and potentially represents a serious bottleneck in the optical network.

The papers by Islam et al. published in IEEE Journal of Quantum Electronics 27(3) 843–848 (1991) and Journal of Lightwave Technology 11(12) 2182–2190 (1993) describe a ring network in which logic operations are carried out on packet headers in the optical domain using soliton-based fibre logic gates. Although this avoids some of the bandwidth limitations of the Bononi system, the system again relies upon address recognition as the basis of the routing decision. In the example described, the routing decision is limited to determining whether or not a given packet carries the local address of the node, and so the module is not able to route intelligently packets not addressed to that node. Even this limited routing ability requires the processing of a full address, and more complex routing decisions would require the storing and processing of many such addresses.

The paper by Prucnal et al, published in Optical Engineering 29 (3) 170–182 (1990) discloses an optical routing controller which, as in the prior art systems discussed above, relies upon address recognition. The controller reads destination addresses and appropriately sets a photonic switch using an optical look-up table. That look-up table has to carry as many header words as there are addresses on the network, and so for a realistically large network is likely to be undesirably complex in structure and operation.

SUMMARY OF THE INVENTION

According to a first aspect of the present invention, there is provided a method of routing a packet at a routing node on an optical network including carrying out in the optical domain a logic operation on an address word carried in a packet header characterised in that the said logic operation is carried out on the address word and a discriminator word chosen from a set of discriminator words smaller in number than the set of address words for the network or domain of the network in which the said node is located.

The present invention provides a method of routing a packet which makes possible an intelligent decision on the onwards path of a packet from a given node without requiring recognition of the packet address. In making a decision on onwards, routing of a packet, instead of comparing the header with an address, or one of a set of words mapping one-to-one to the network addresses, the present invention uses a discriminator word chosen to discriminate between the group of addresses for which one onwards routing direction is appropriate, and the addresses for which another onwards routing direction is appropriate. This eliminates the need for large look-up tables of addresses at the node, or for complex logic operations, and allows efficient routing using nodes of very low functional complexity.

The invention facilitates the use of a network in which, instead of routing paths being determined centrally, each packet fends its own way through the network. The network thereby provides connectionless transport for the packets i.e. transport not requiring a fixed circuit or path to be established between source and destination. The network will typically have a relatively large number of switches or nodes where traffic steering or processing can take place. A network configured in this fashion might comprise, for example, a dual bus or dual ring with two counter-propagating traffic streams. The switch or node would then determine which of the two directions of propagation would take a given packet more quickly to its destination.

The logic operation may comprise two or more individual Boolean operations on different respective discriminator words. The logic operation preferably is a bit-wise AND operation.

Preferably the method further comprises carrying out an additional logic operation on the address word and on a respective additional discriminator word thereby determining whether the packet is addressed to a remote region of the network, and when the packet is so addressed routing the packet directly towards the said region.

Considering again the example of a dual ring network, the node may in some cases find that the address carried in the header of the packet is for a destination on the far side of the ring. Then, rather than send the packet off on its way step-by-step around the circumference of the ring, it is more effective to steer the packet directly onto a link connecting opposite sides of the ring, thus bringing the packet more quickly towards its destination. This idea may be extended by the introduction of further links to provide a topology which is more highly interconnected than a simple ring.

Preferably the header of each packet includes an address comprising a plurality of address words corresponding to different sub-fields of the address. Preferably the different sub-fields correspond to different respective levels of a hierarchy of addresses, an address at one level corresponding to a domain encompassing a plurality of addresses at the next respective level, and so on.

The addresses in the packet headers may be encoded using the sub-set of binary words for which word recognition can be carried out by a simple AND operation, as described and claimed in our co-pending International patent application PCT/GB94/00397.

According to a second aspect of the present invention, there is provided a node for routing a packet carried on an optical network, characterised by a routing decision unit arranged to carry out in the optical domain a logic operation on an address word carried in the header of the packet and a predetermined discriminator word, and a switch responsive to the routing decision unit and arranged to route the packet in different directions depending on the result of the said logic operation.

Preferably the routing decision unit includes one or more optical AND gates.

According to a third aspect of the present invention, there is provided an optical network comprising a plurality of nodes, each node having a different respective address, and each node including a routing decision unit arranged to carry out a logic operation on an address word carried in the header of a packet carried by the network, characterised in that each said routing decision unit is programmed with a discriminator word chosen from a set of discriminator words smaller than the number of address words and is arranged to carry out the said operation on said address word and the respective discriminator word.

Preferably the network may be a dual-bus or ring network, or alternatively a two-dimensional network such as a 2-connected network, and in this case preferably is picket fence network, as defined herein.

In multi-gigabit optical transmission networks, a key design aspect is how to maintain proper time synchronisation of the various signal processing and switching equipments across the network. In optical time-division multiplexed (OTDM) networks, accurate bit-level timing information is needed at the network nodes to carry out operations such as demultiplexing and drop-and-insert of OTDM channels. However, in OTDM the transmission links between network nodes carry continuous bit streams, and so the bit-level timing information can be extracted using clock recovery based on phase-locked loops (such as microwave electronic clock recovery or all-optical clock recovery). On the other hand, in ultrafast asynchronous packet networks, where the bit streams are broken up into short bursts (packets), a different approach is needed.

According to a fourth aspect of the present invention there is provided a method of processing a packet carried on an optical network characterised by using both a global packet-level clock and a local bit-level clock.

DESCRIPTION OF THE DRAWINGS

Systems embodying the present invention will now be described in further detail, by way of example only, with reference to the accompanying drawings in which:

FIG. 12 shows a modified decision logic diagram for node 3 in the network of FIG. 10;

FIG. 13 is a diagram illustrating the address structure of a packet carried on a network embodying the present invention;

DESCRIPTION OF EXAMPLES

Figure 15:
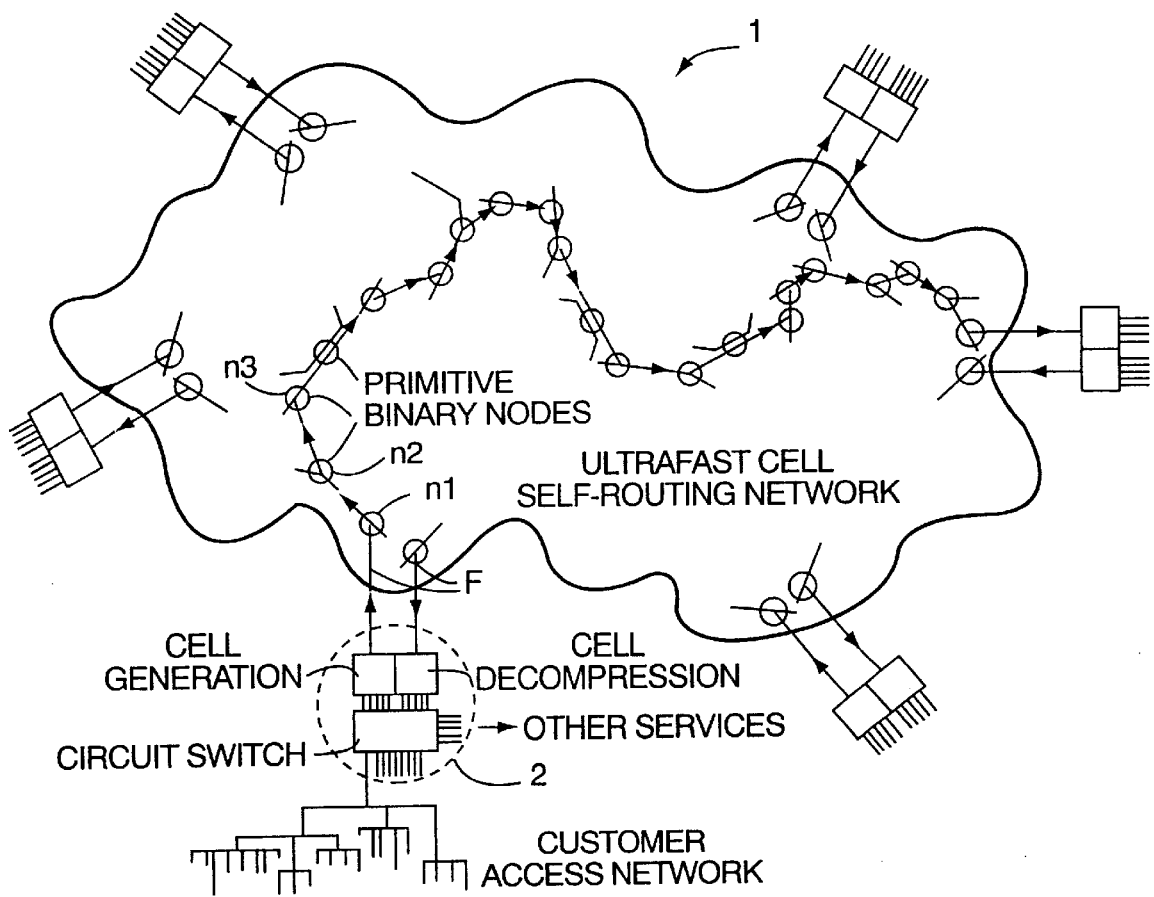
FIG. 15 is an overview of a telecommunications network incorporating the ring network of FIG. 8.

A high-speed optical telecommunications network 1 is formed from monomode optical fibres (F). As shown in FIG. 15, the net-work is connected via nodes n1, n2 . . . to access circuits 2 arranged to carry out packet generation and packet decompression. The access nodes 2 receive incoming lower-speed data channels and packetise the data to form short fixed-length packets or cells. These packets may use, for example, an ATM frame structure. They include, in the optical header, data indicating the destination address for the respective packet. In this first example, the network has a dual bus structure, as shown in further detail in FIG. 1. One bus carries packets propagating in one direction, and the other bus packets propagating in the opposite direction. Each node, other than those at the extreme ends of the network includes a routing decision circuit incorporating one or more optical AND gates. Using this circuit, each node ANDs a few short words or fragments of words from the address field of a packet with a fixed predetermined discriminatory word or words characteristic of the particular node, and switches its output to put the packet on one or other of the two buses as appropriate. As a simple example, if the address is determined to be one of the next few nodes in the forward direction of the bus, then the routing decision circuit will direct the packet onto the one of the two buses carrying forward-propagating traffic. Similarly if it were one of the immediately preceding nodes, then the packet would be output onto the other of the two buses.

As described in further detail below, the routing decision operation requires only a simple optical AND logic, and similarly an AND operation is used at each node for address recognition. In the present embodiment, the binary address words for the packets are chosen from the restricted set of n-bit words satisfying the property that for any two words $A=a_1a_2 \ldots a_n$ and $B=b_1b_2 \ldots b_n$ the set, $A \otimes B=0$ only if $A=B$, otherwise $A \otimes B=1$ where $A \otimes B$ denotes the Boolean expression $$\sum_{i=1}^{n} a_i \cdot \overline{b}_i$$

and $\overline{x}$ denotes the logical complement of x. The use of this set of binary words for word recognition is described and claimed in the present applicant's co-pending international application WO94/21088. As discussed in that application, the maximum possible number of n-bit words within the set, assuming n is an even number, comprises $n!/[(n/2)!]^2$ words consisting of n/2 ones and n/2 zeros in all permutations. For n odd, there are two equal-sized and mutually exclusive maximum sets each comprising $n!/\{[(n+1)/2]![n-1)/2]!\}$ words; one set contains words consisting of (n+1)/2 ones and (n−1)/2 zeros in all permutations, and the other set is obtained from the first by interchanging zeros and ones.

Using this restricted set of words, address recognition is then carried out using an optical AND operation of the form $A \otimes B$. By contrast, the packet routing uses AND operations of the form $A \boxtimes B$ as defined below. While the use of the restricted word-set is preferred since it simplifies the address recognition stage, the use of this restricted word-set is not essential to the packet routing decision. The operation $A \boxtimes B$ can be used for routing decision logic even where A and B are not from the restricted word-set.

Using this restricted set, in the case of a network with 20 nodes for example, the addresses may be denoted by the 20 distinct 6-bit words consisting of three ones and three zeros in all permutations. It is convenient, but not essential, to allocate addresses to the nodes along the bus in ascending order of their value as binary numbers (in this example, starting with 000111 and ending with 111000).

Figure 1:
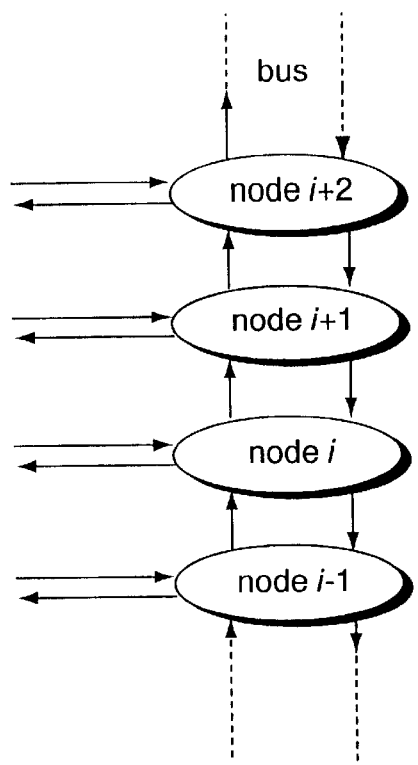
FIG. 1 shows a dual bus network.
Figure 2:
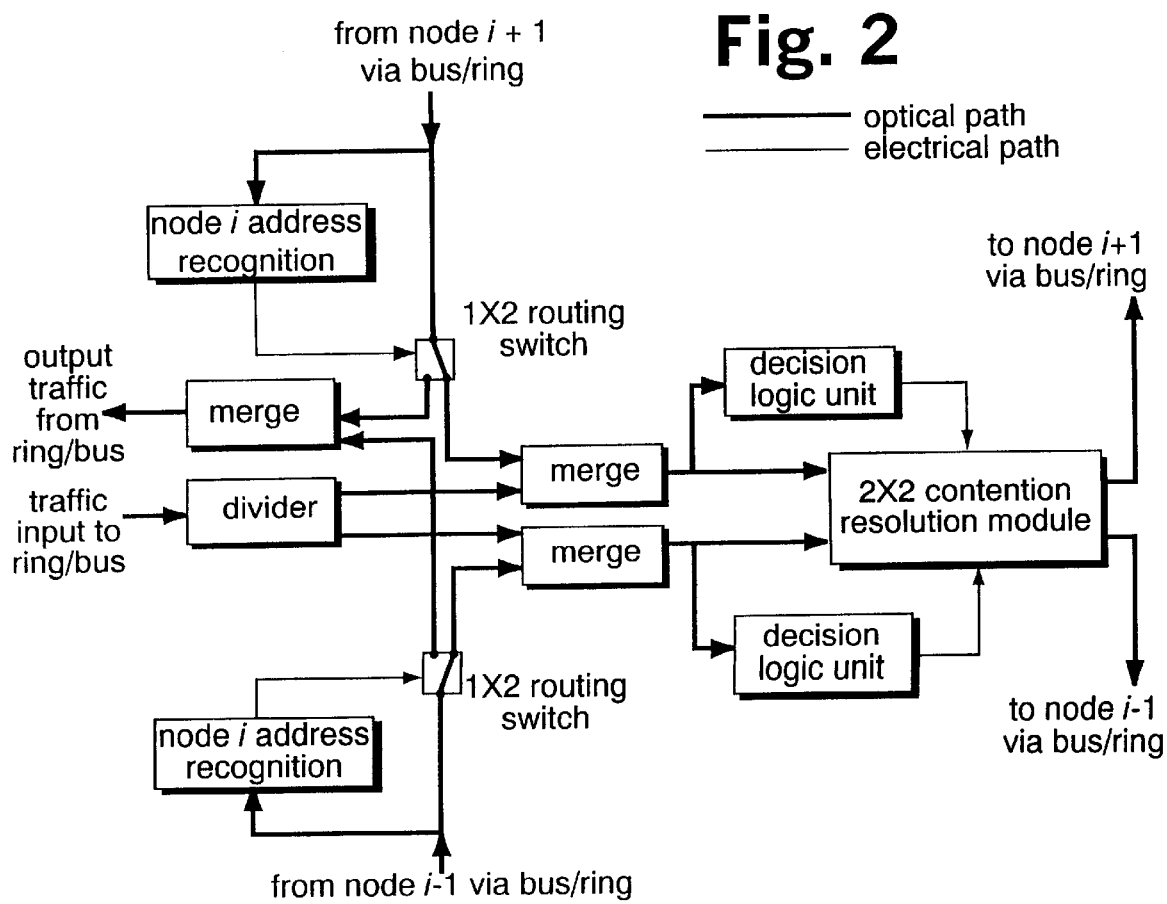
FIG. 2 shows an example of a node for use in the network of FIG. 1.

FIG. 2 shows a possible layout for an ith node on the dual bus network of FIG. 1. The same structure may be used also in a dual ring network as in the embodiments described below.

Packets arriving from adjacent nodes (i−1) and (i+1) on the bus are examined by node i address recognition units. These carry out an AND operation on the address carried by the packet together with a target word corresponding to the address of the node in the manner described in our above-cited international application. If this operation indicates that the address carried by this packet is that of this node (node i), so that the packet is destined to leave the bus via this node, then the 1×2 routing switch associated with the respective address recognition unit is set accordingly to direct the packet onto an output route leading away from the bus. All other packets arriving from adjacent nodes and not destined to exit via this node are directed onwards to a decision logic unit and output contention resolution module. Packets entering the network at this ith node are merged into the traffic stream going to the decision logic unit and contention resolution module.

The output contention resolution module performs the task of routing each outgoing packet towards the appropriate one or other of the adjacent nodes, whilst ensuring that no two packets are directed to the same output simultaneously.

The decision logic unit determines which of the two outgoing routes is the appropriate one for each packet, and instructs the output contention resolution module accordingly. If contention cannot be resolved, one or more packets is diverted onto the "wrong" route, travels to the next node in the "wrong" direction, and there is redirected to the correct route.

The output contention resolution module may be for example the device described by D. K. Hunter and I. Andonovic (Elec. Letts. 29, 280–281, 1993). It is a switch fabric consisting of a sequence of electrically-controlled 2×2 optical switches and optical delay lines. The optical switches may be, for example, lithium niobate devices type Y-35-8772-02 supplied by GEC Advanced Optical Components, or 2×2 integrated InP semiconductor devices of the type described by G. Sherlock et al (Elec. Letts 30, 137–138, 1994). Since the optical delays required in the contention resolution module are integer numbers of the packet period (typically 1 ns or longer), the delay lines in this case may be made from appropriate lengths of optical fibre. The merge units shown in FIG. 2 may comprise circuits of the form described in our co-pending application EP 94306015.2. These use the same optical technology as the output contention resolution module. The divider unit may be an electrically-controlled 1×2 optical switch (alternatively the 2×2 devices mentioned above would be satisfactory) arranged to send packets to one of its two outputs alternately. This has the effect of tending to balance the additional traffic load on each of the two inputs to the contention resolution module. This is not an essential feature but is advantageous under some traffic conditions.

Figure 6C:
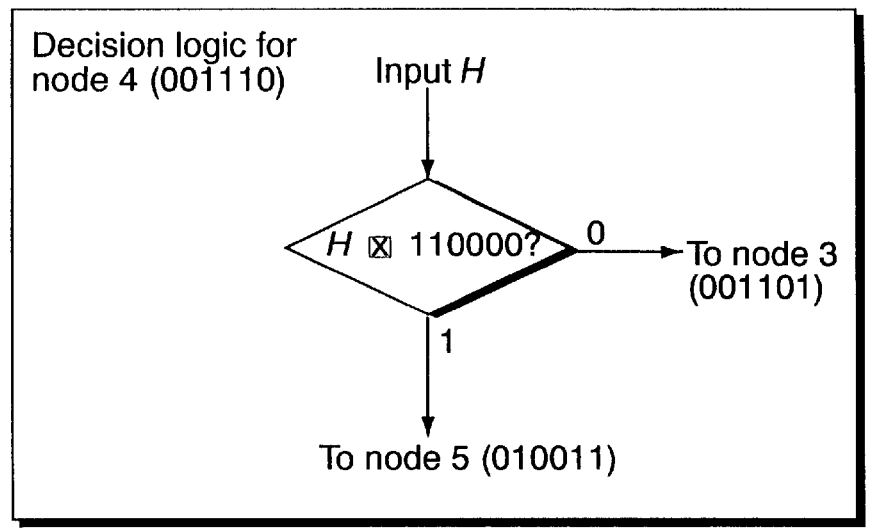
FIGS. 6a to 6r are logic diagrams for nodes 2 to 19 of a 20-node dual bus network.
Figure 6D:
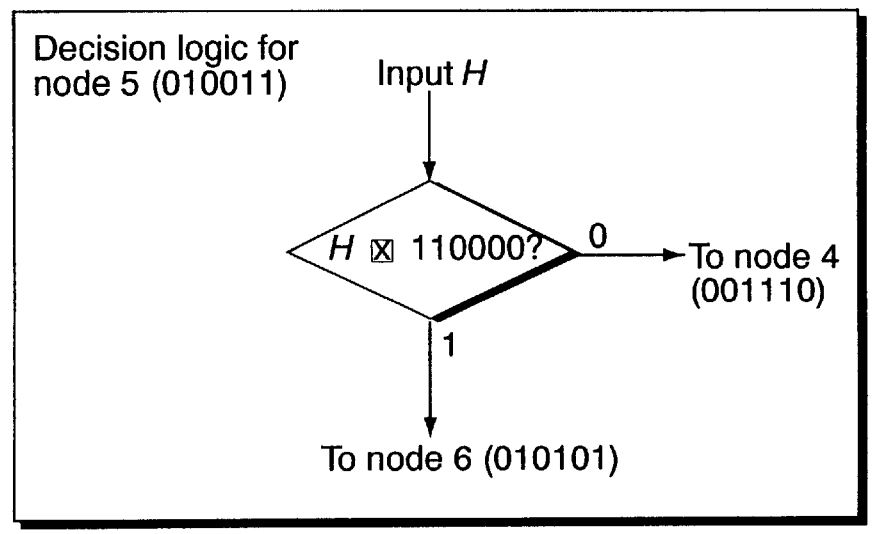
Figure 6E:
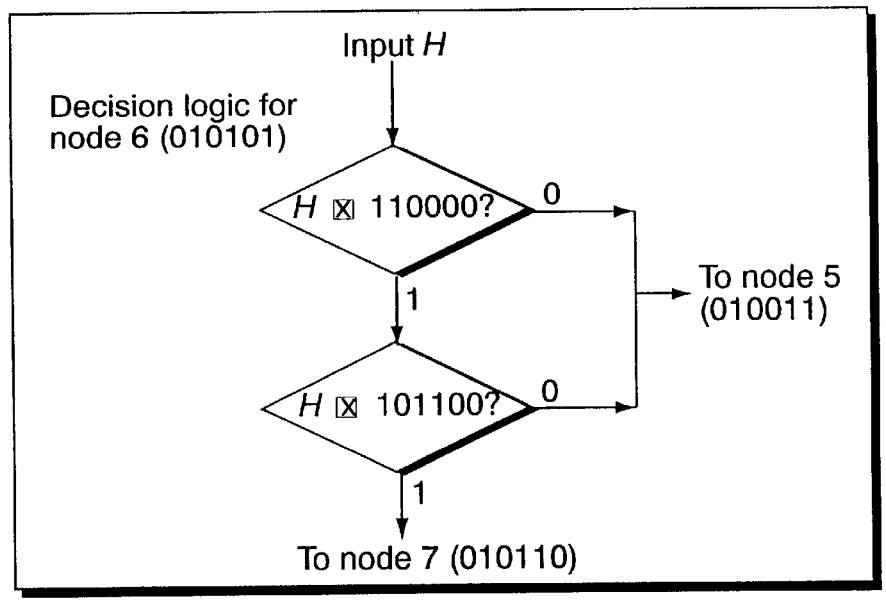
Figure 6F:
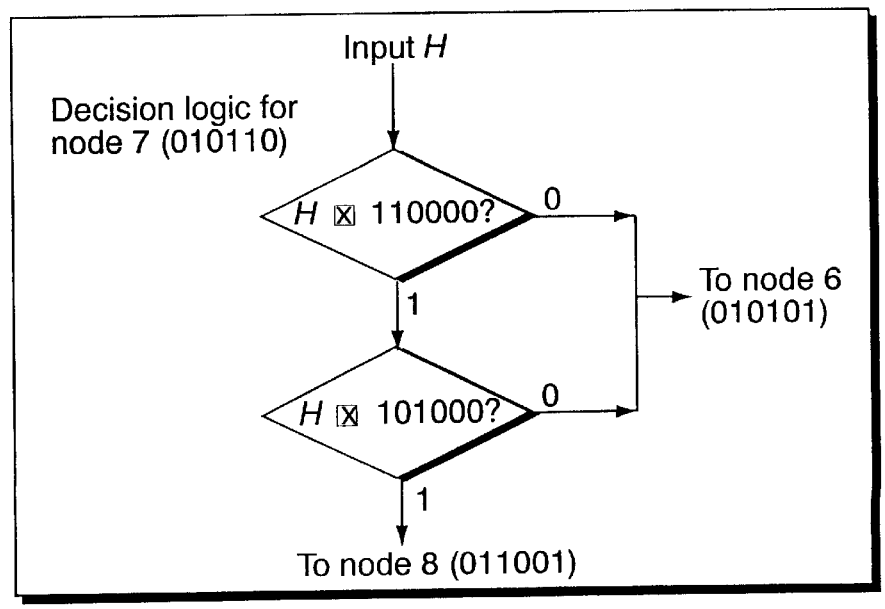
Figure 6G:
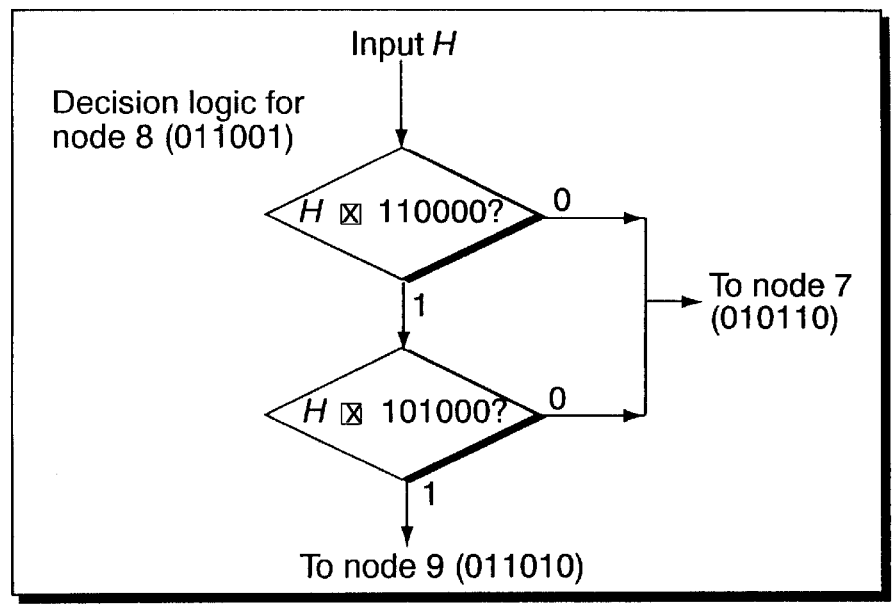
Figure 6H:
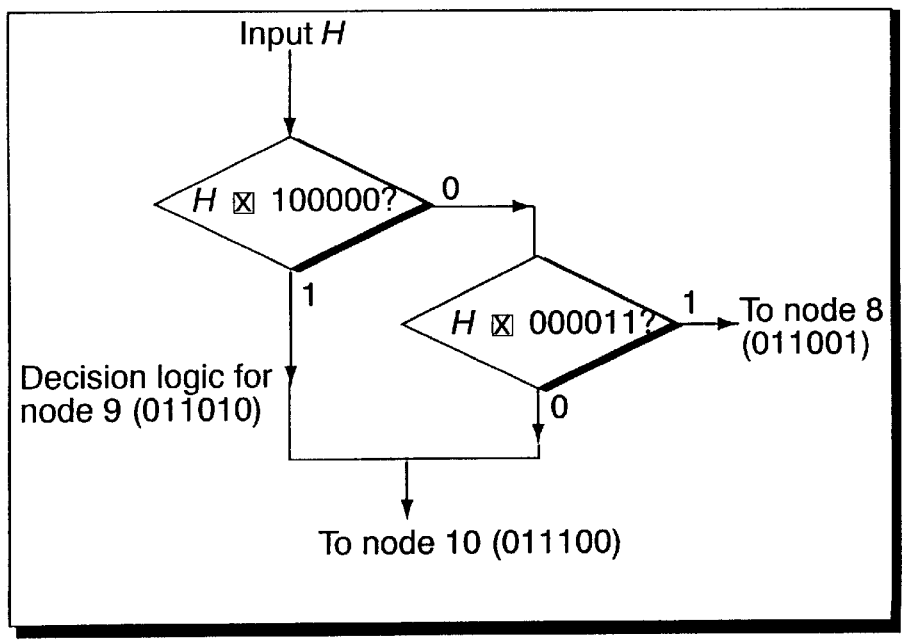
Figure 6I:
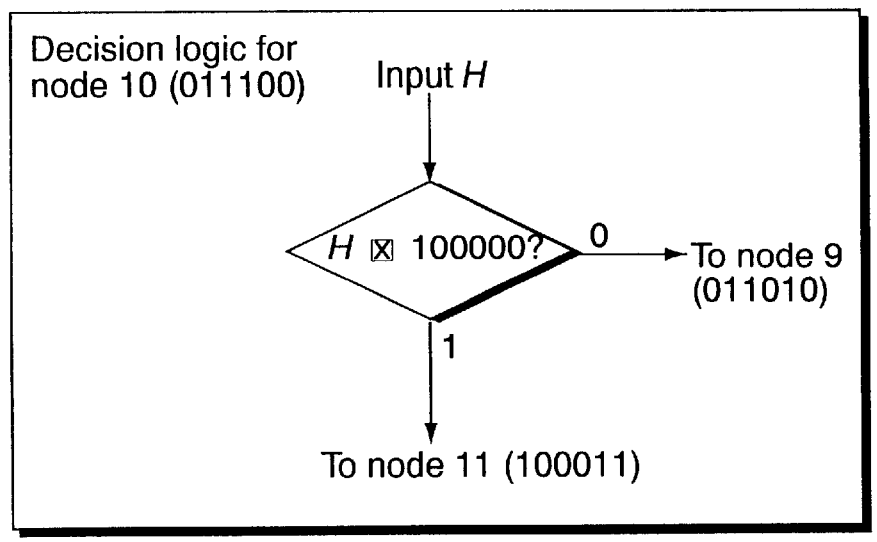
Figure 6J:
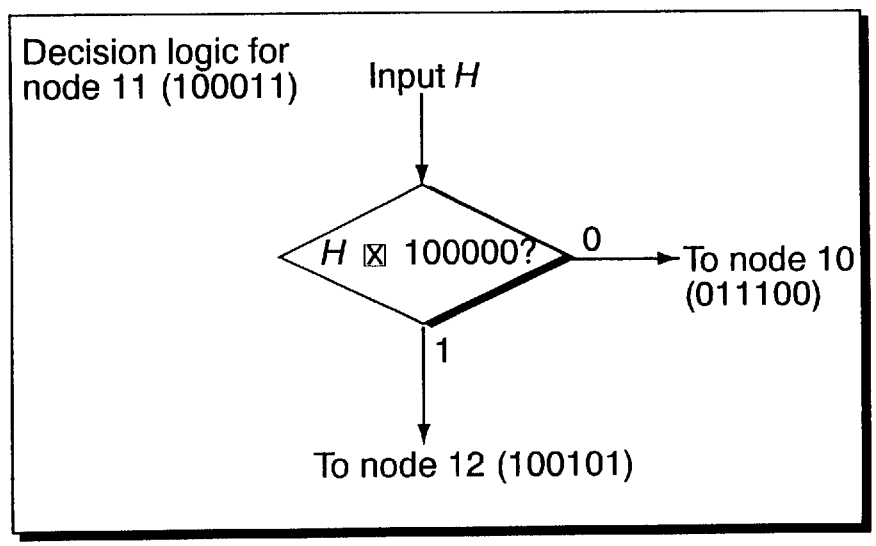
Figure 6K:
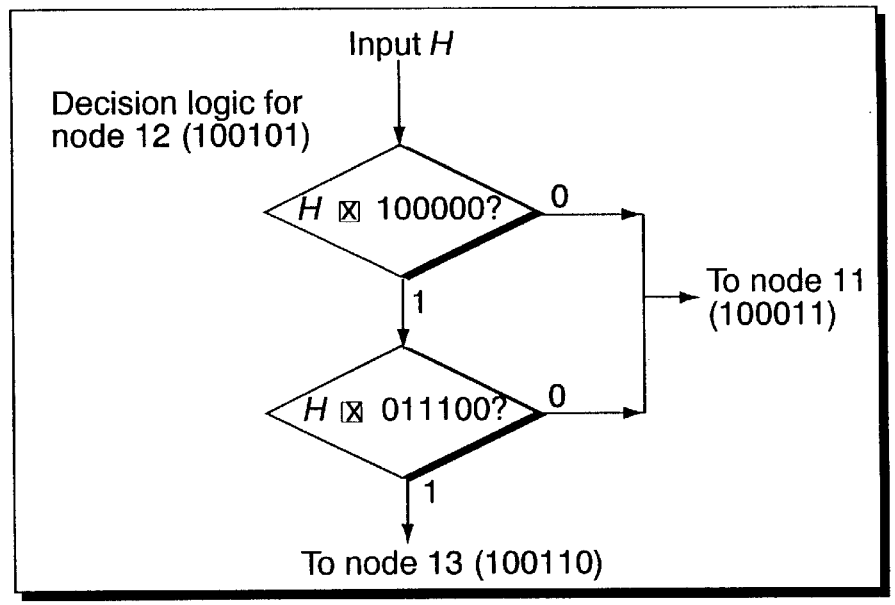
Figure 6L:
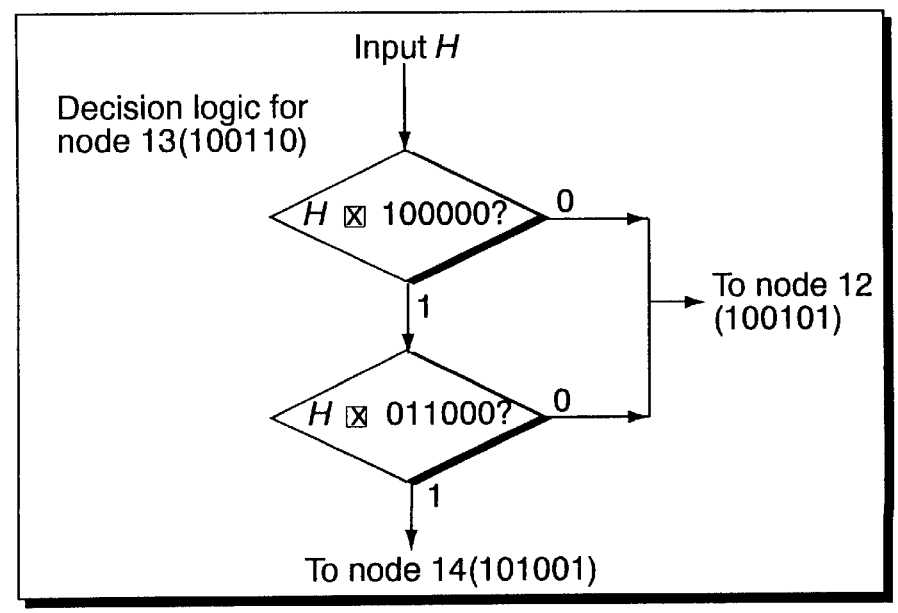
Figure 6M:
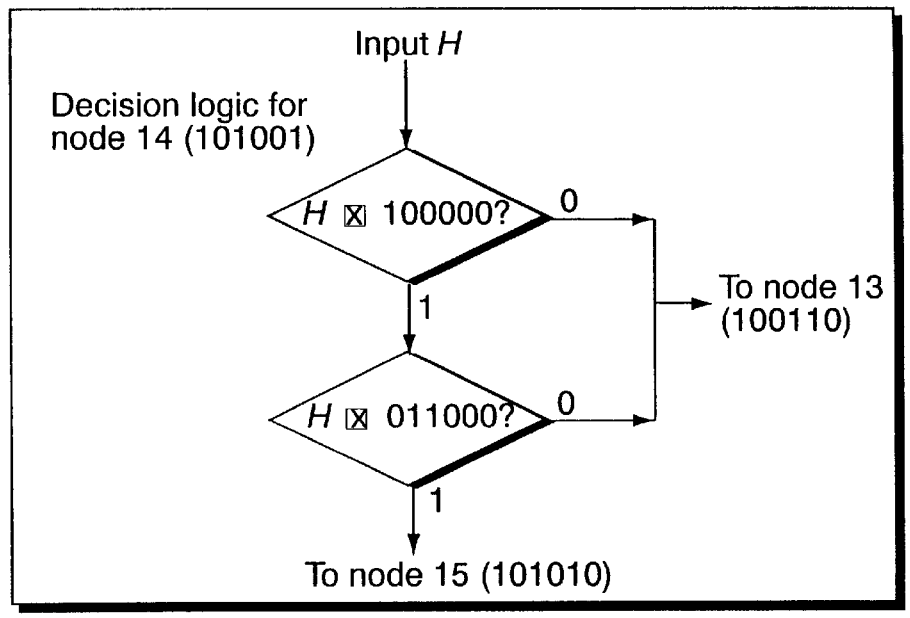
Figure 6N:
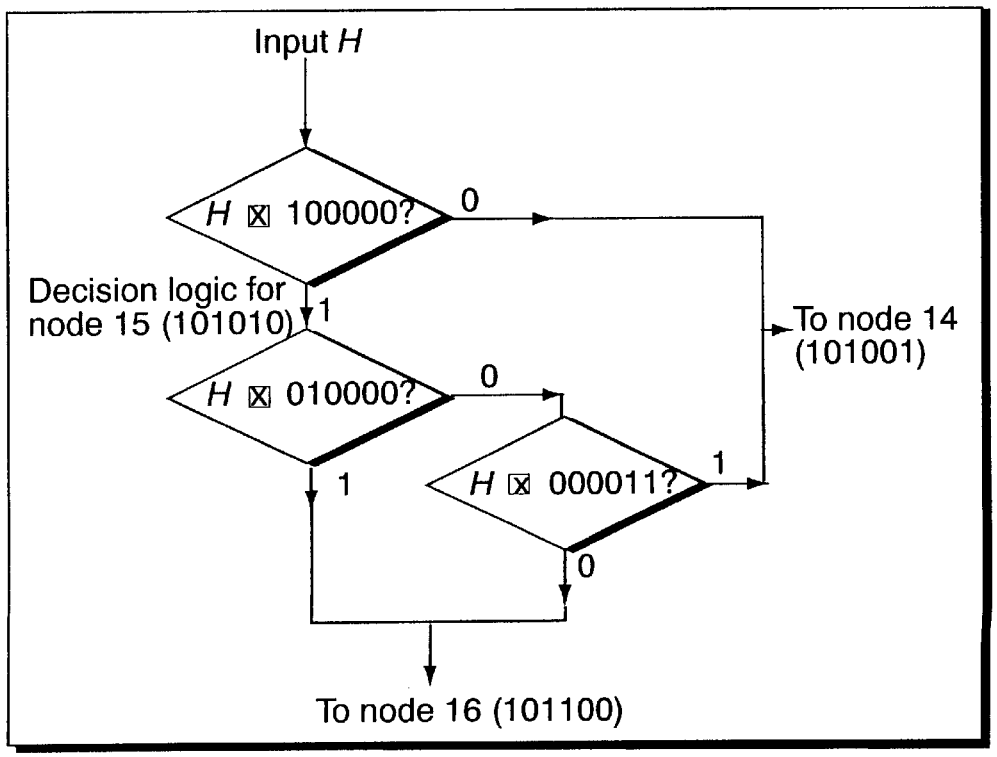
Figure 6O:
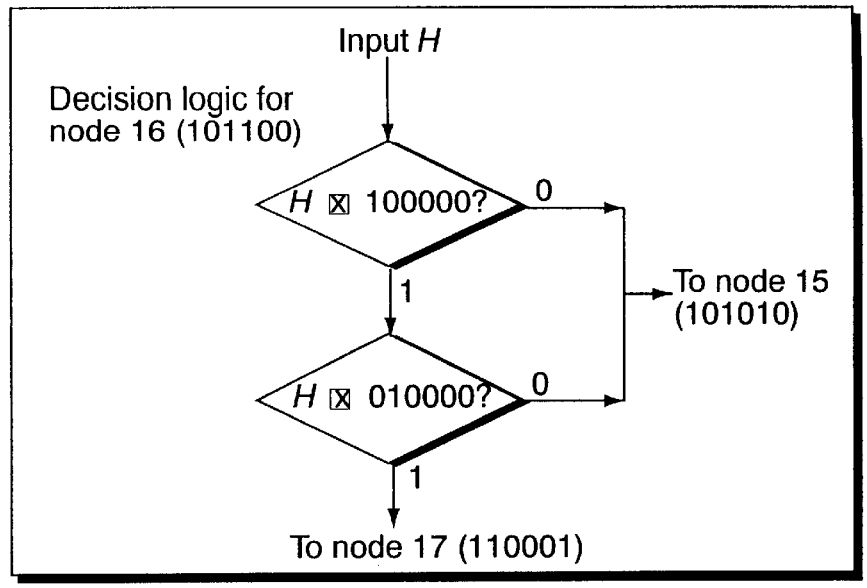
Figure 6P:
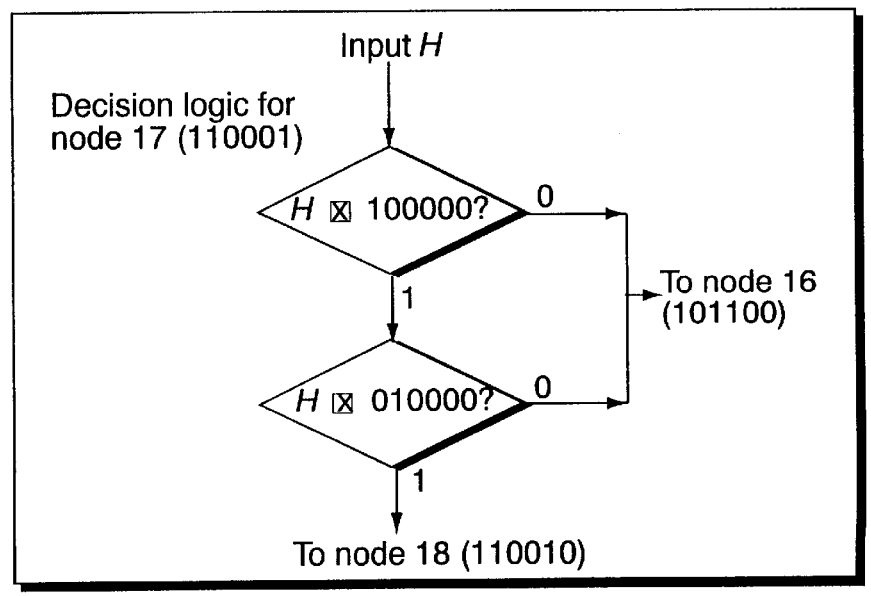
Figure 6Q:
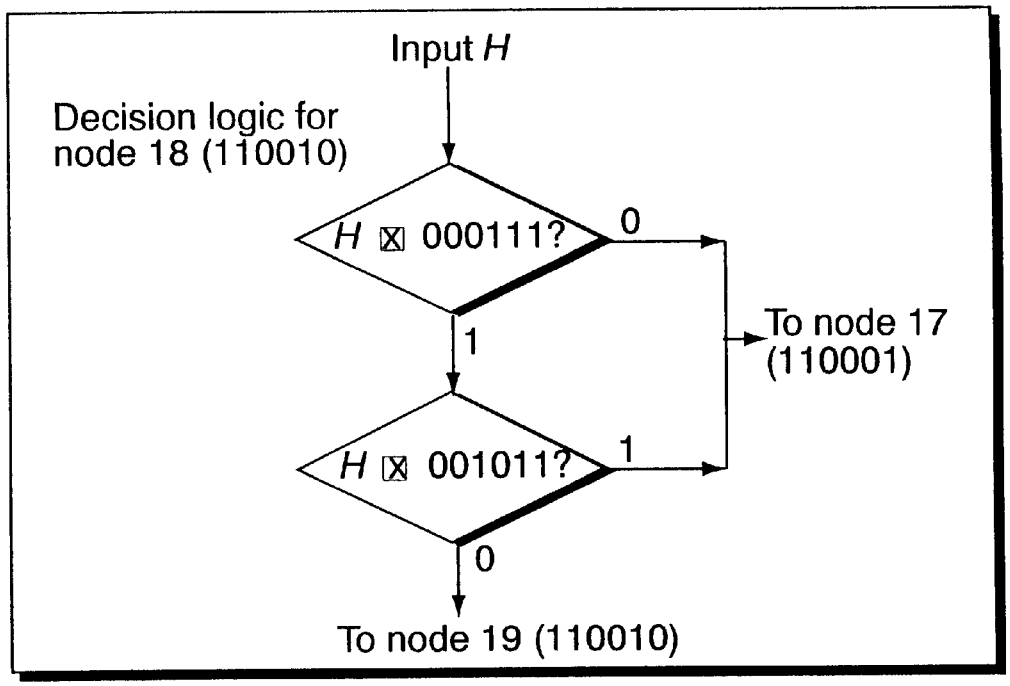
Figure 6R:
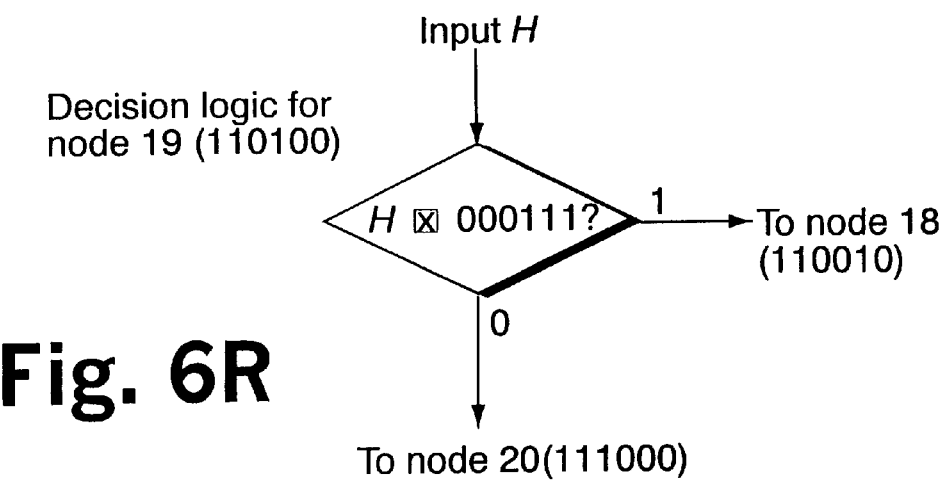
Figure 7:
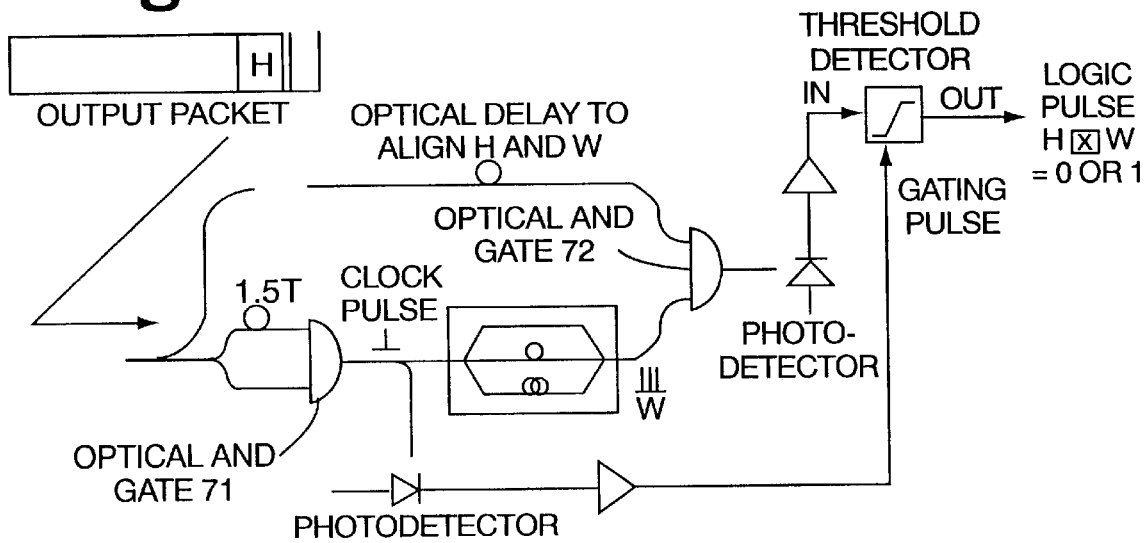
FIG. 7 is a circuit diagram for one of the decision logic units of FIG. 2.

The functioning of the decision logic units will now be described in further detail. FIGS. 3 to 6 show the decision logic for a dual bus network with nodes having 3-bit, 4-bit, 5-bit and 6-bit addresses respectively. FIG. 7 illustrates an appropriate hardware implementation of a decision logic unit.

Figure 3A:
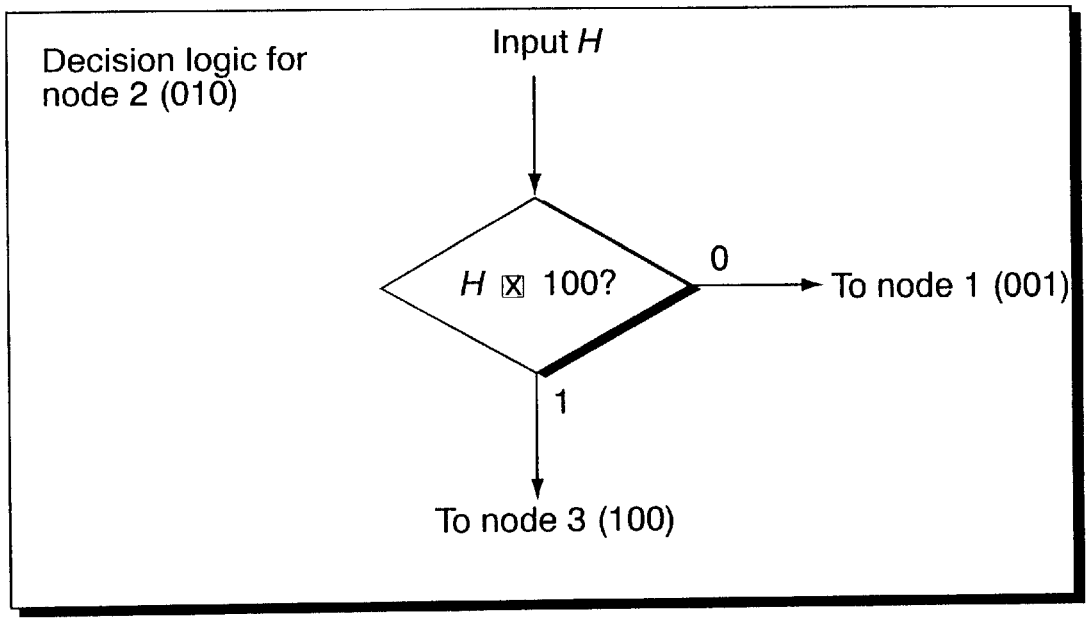
FIGS. 3a and 3b are logic diagrams for a three node network using two alternative address schemes.

FIG. 3 shows the decision logic required for the simple case of a dual bus network having just three nodes. In FIG. 3a, it is assumed that the addresses of the nodes are represented by a 3-bit word $H=h_1h_2h_3$ consisting of 1 one and 2 zeros in all permutations and arranged along the bus in the sequence of ascending binary value 001, 010 and 100 as shown in Table 1 below.

TABLE 1

| Node | Address |
|------|---------|
| 1    | 001     |
| 2    | 010     |
| 3    | 100     |

No decision logic is required for node 1 (address 001) or node 3 (address 100) because they are situated at the ends of the bus—in other words there is only one route for outgoing traffic from each of these nodes. At node 2 (address 010) a decision must be made as to whether outgoing packets should travel towards node 1 or node 3. The appropriate decision logic for node 2 is shown in FIG. 3a. In this figure and elsewhere we use the notation $$A \boxtimes B = \sum_{i=1}^{n} a_i \cdot b_i$$

where A and B are n-bit words, $A=a_1a_2 \ldots a_n$ and $B=b_1b_2 \ldots b_n$. In FIG. 3 for example, $H \boxtimes 100$ means $h_1 \cdot 1 + h_2 \cdot 0 + h_3 \cdot 0 = h_1$.

Figure 3B:
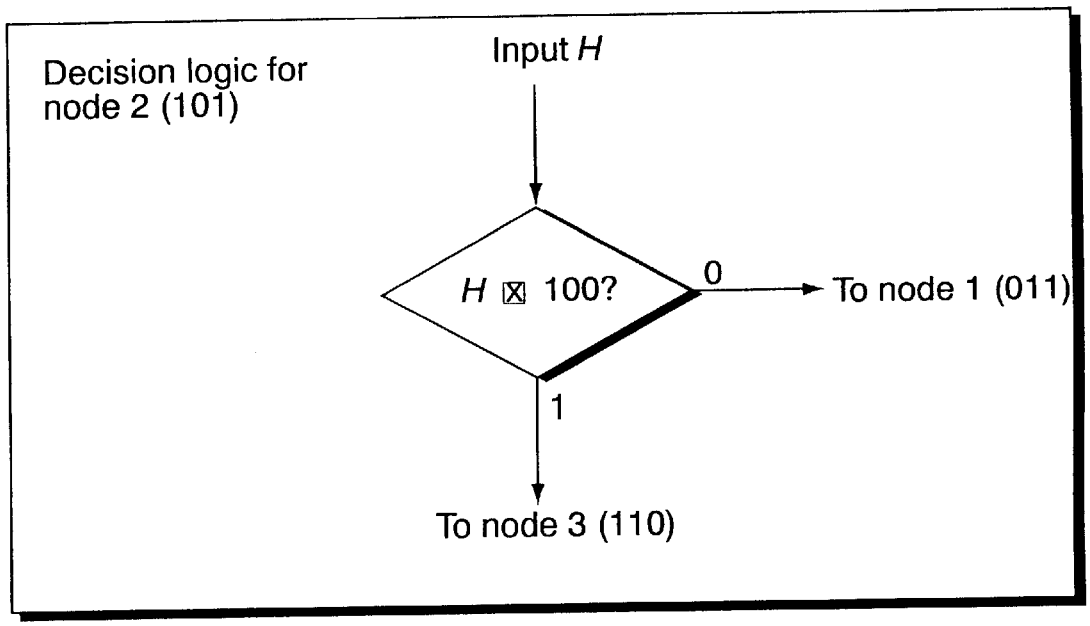
Figure 4A:
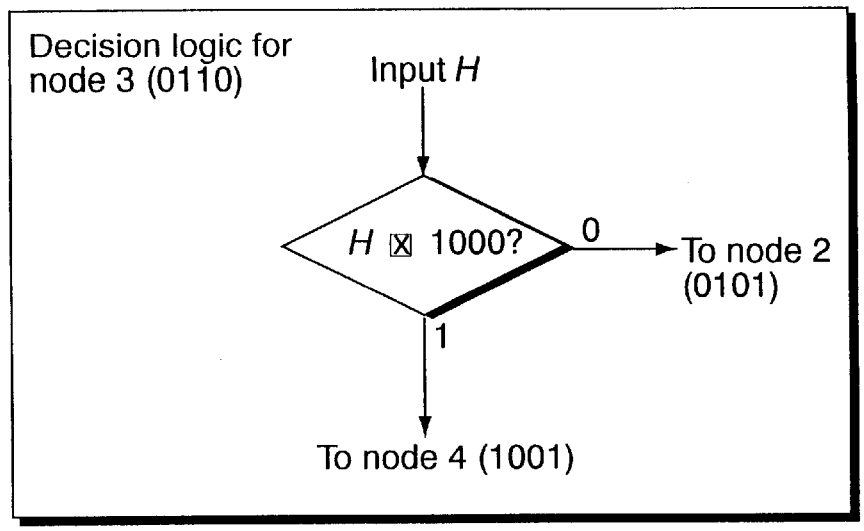
FIGS. 4a to 4d are logic diagrams for nodes 2 to 5 of a 6-node dual bus network.
Figure 4B:
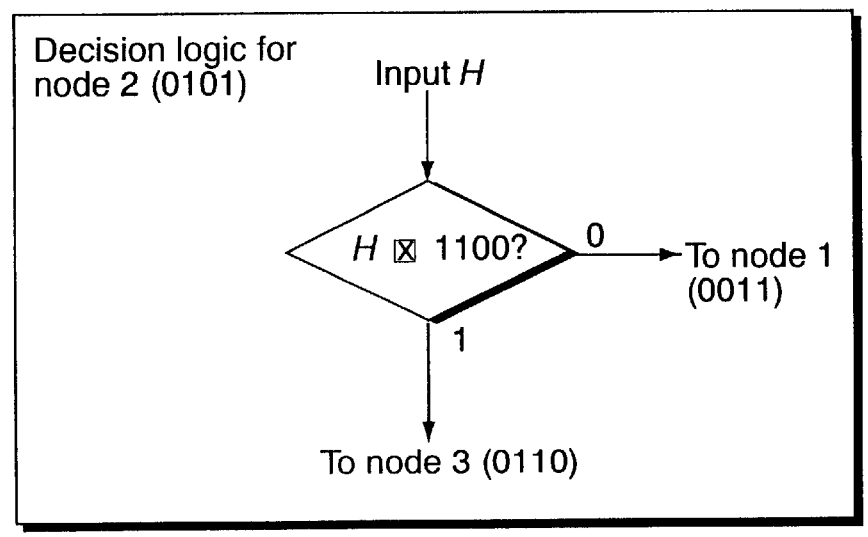
Figure 4C:
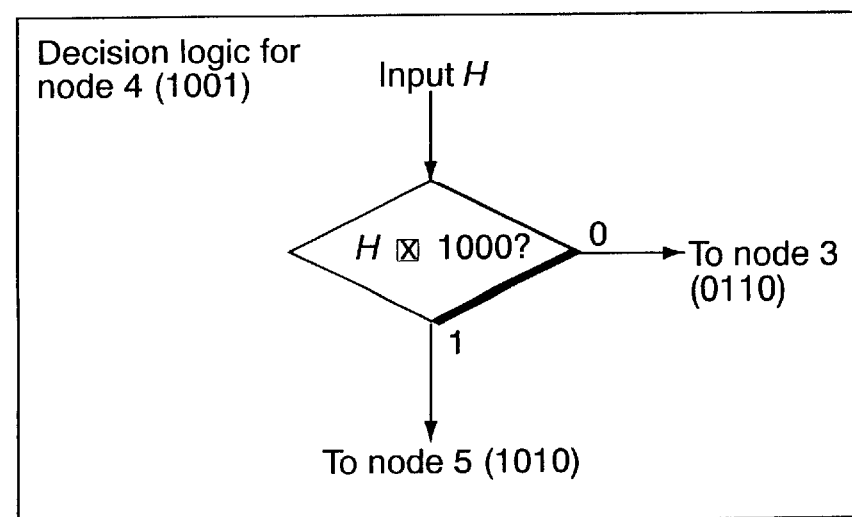
Figure 4D:
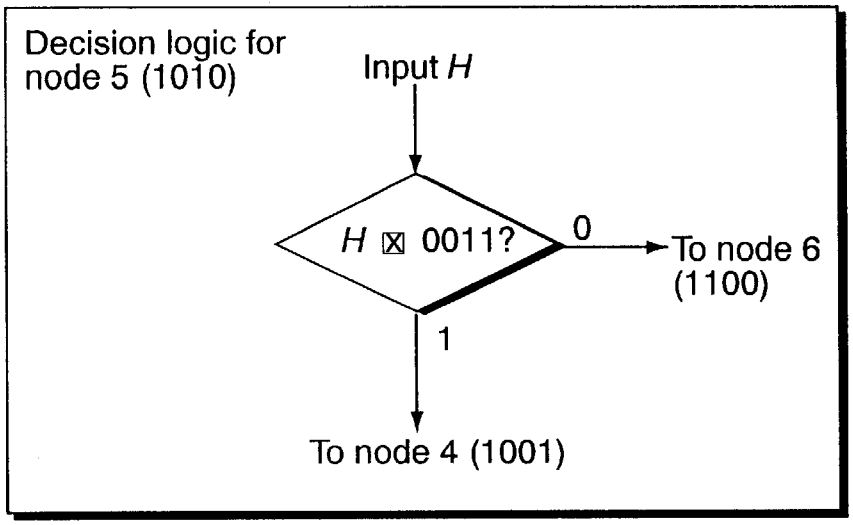
Figure 5A:
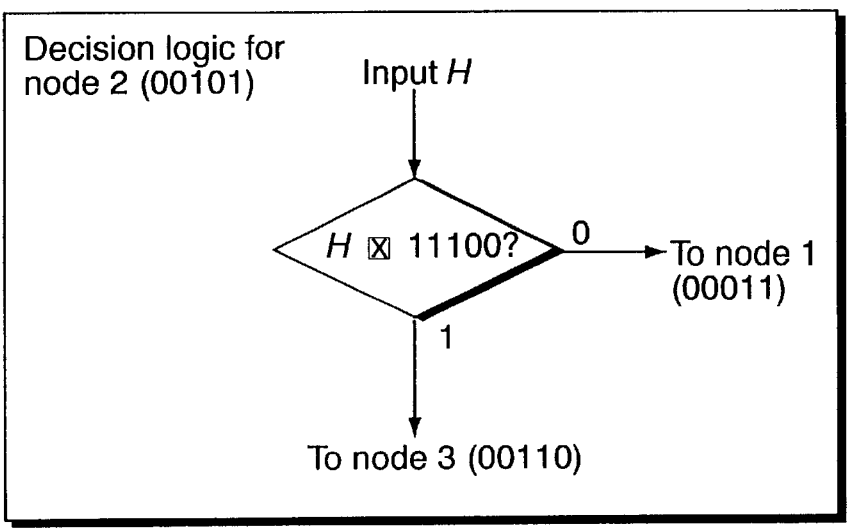
FIGS. 5a to 5h are logic diagrams for nodes 2 to 9 of 10-node dual bus network.
Figure 5B:
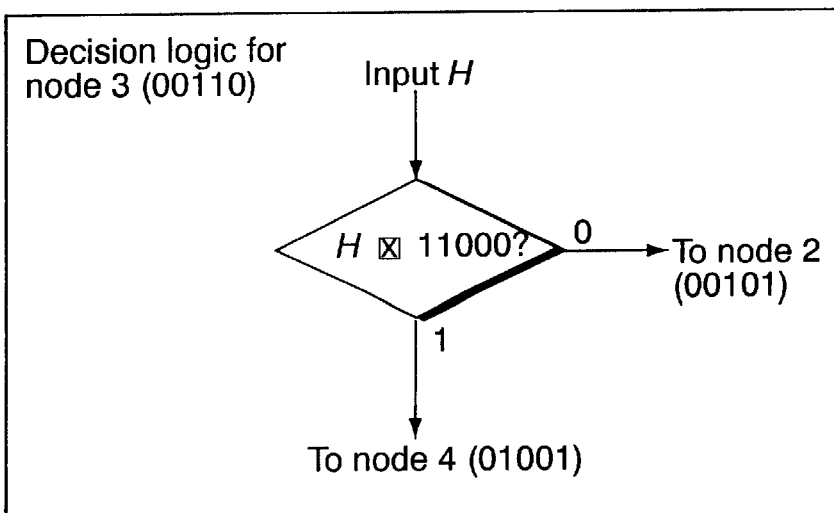
Figure 5C:
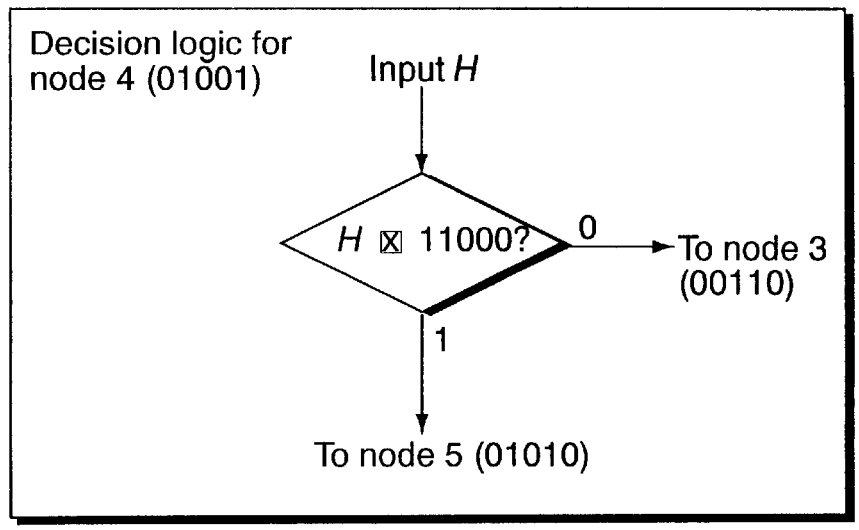
Figure 5D:
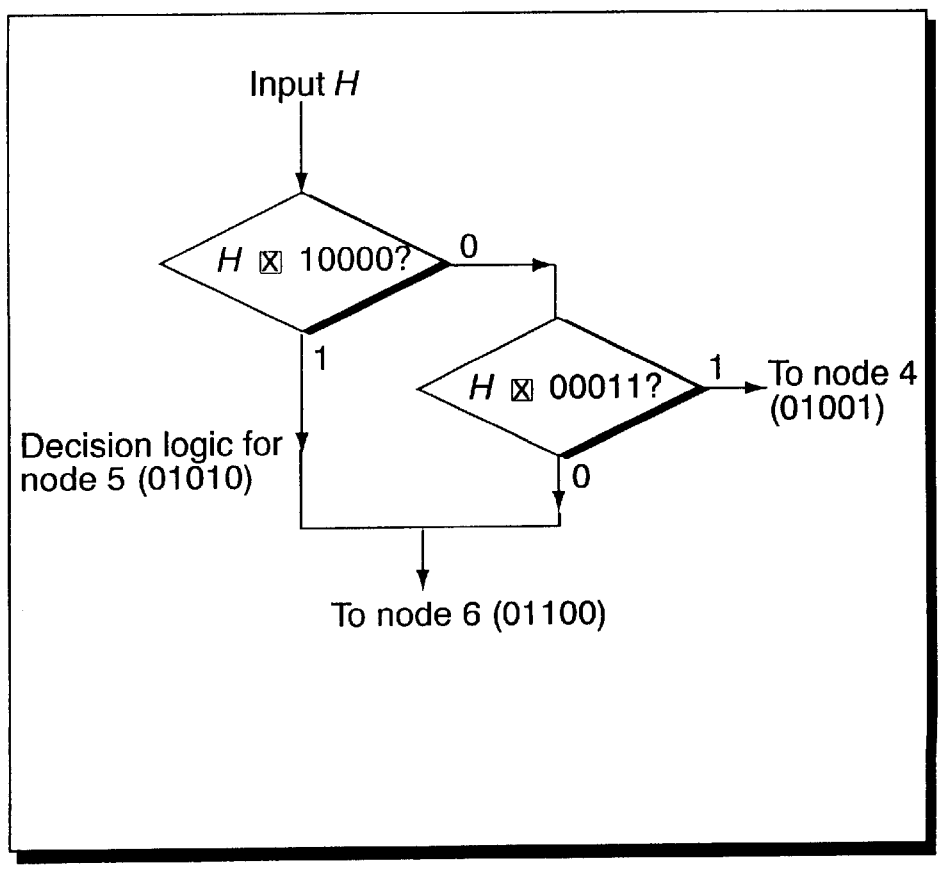
Figure 5E:
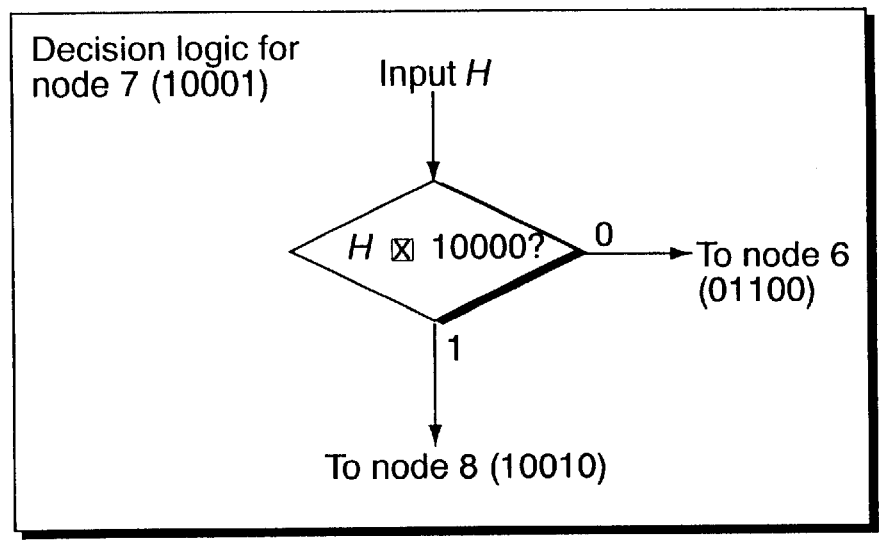
Figure 5F:
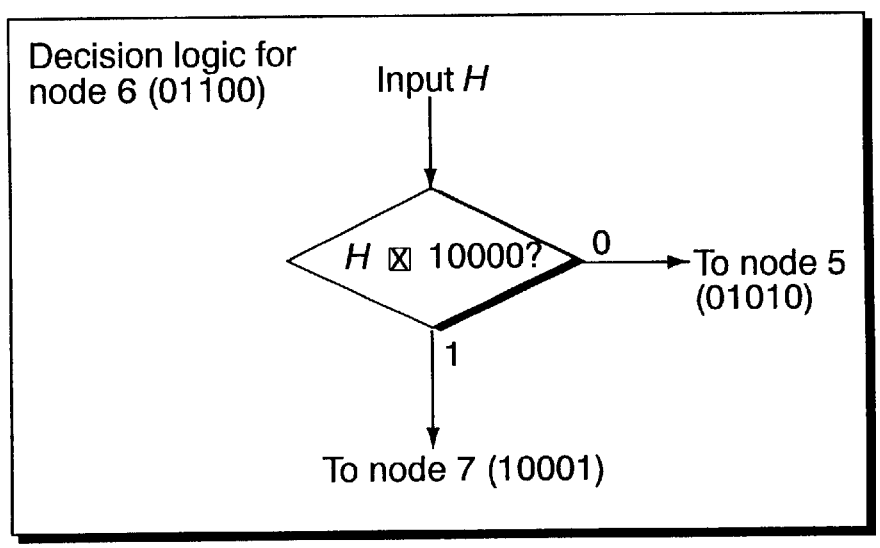
Figure 5G:
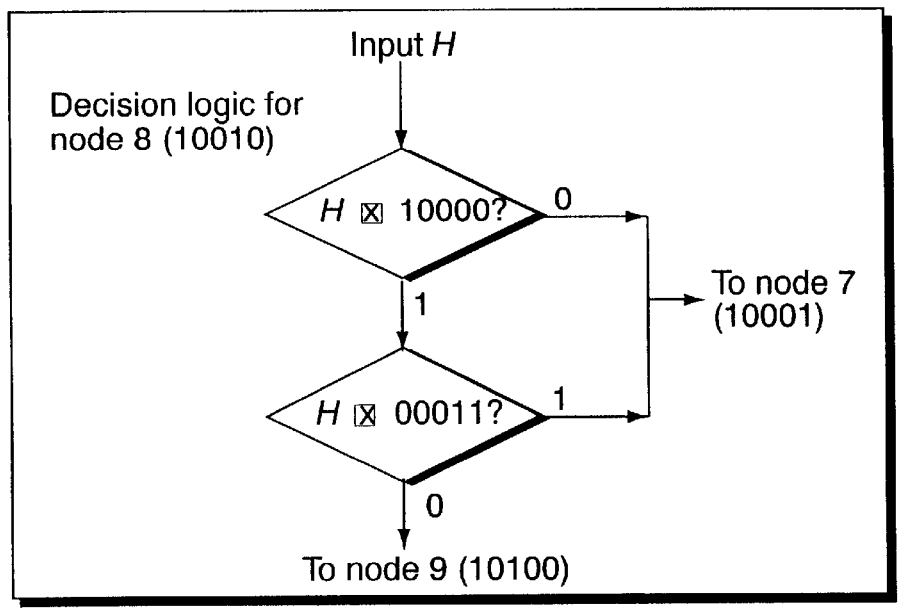
Figure 5H:
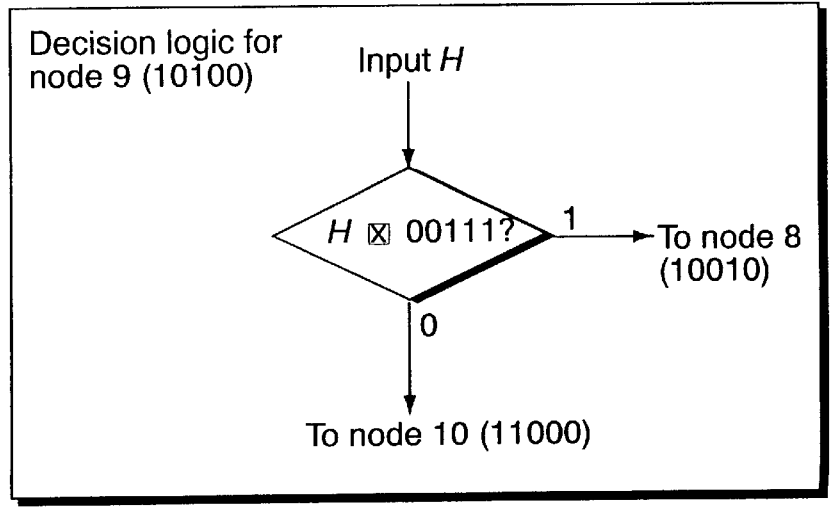

Alternatively, the address scheme with 3-bit address words consisting of 2 ones and 1 zero in all permutations, as set out in Table 2 below, could be used. In that case, the decision logic for node 2 is as shown in FIG. 3b. In both cases, the predetermined discriminator word used in the decision logic is 100, but the different outputs are mapped differently to the logic values produced by the operation depending on the address scheme used.

TABLE 2

| Node | Address |
|------|---------|
| 1    | 011     |
| 2    | 101     |
| 3    | 110     |

FIG. 4 shows the decision logic required for the case of a dual bus network having 6 nodes with the addresses of the nodes represented by a 4-bit word $H=h_1h_2h_3h_4$ consisting of 2 ones and 2 zeros in all permutations, arranged along the bus in sequence of ascending binary value.

TABLE 3

| Node | Address |
|------|---------|
| 1    | 0011    |
| 2    | 0101    |
| 3    | 0110    |
| 4    | 1001    |
| 5    | 1010    |
| 6    | 1100    |

As before, no decision logic is needed for the end nodes, 1 and 6. As seen in the figures, in this case node 2 uses the discriminator word 1100, nodes 3 and 4 the discriminator word 1000 and node 5 the discriminator word 0011.

FIG. 5 shows the decision logic required for the case of a dual bus network with 10 nodes with the addresses of the nodes represented by 5-bit words consisting of 2 ones and 3 zeros in all permutations arranged along the bus in the sequence of ascending binary value.

TABLE 4

| Node | Address |
|------|---------|
| 1    | 00011   |
| 2    | 00101   |
| 3    | 00110   |
| 4    | 01001   |
| 5    | 01010   |
| 6    | 01100   |
| 7    | 10001   |
| 8    | 10010   |
| 9    | 10100   |
| 10   | 11000   |

As before, no decision logic is needed for end nodes 1 and 10. It will be seen that in this case, some of the nodes require two discriminator words and a corresponding pair of logic operations to make the binary routing decision. This is the case, for example, for node 5 (address 01010). As in the case with n=3 (FIG. 3b) an alternative address scheme for 20 nodes could be used, consisting of 5-bit words with 3 ones and 2 zeros in all permutations. The decision logic would be then similar to that shown in FIG. 5.

FIG. 6 shows the decision logic required for the case of a dual bus network having 20 nodes with the addresses of the nodes represented by a 6-bit word $H=h_1h_2h_3h^4h_5h_6$ consisting of 3 ones and 3 zeros in all permutations, arranged along the bus in sequence of ascending binary value.

TABLE 5

| Node | Address |
|------|---------|
| 1    | 000111  |
| 2    | 001011  |
| 3    | 001101  |
| 4    | 001110  |
| 5    | 010011  |
| 6    | 010101  |
| 7    | 010110  |
| 8    | 011001  |
| 9    | 011010  |
| 10   | 011100  |
| 11   | 100011  |
| 12   | 100101  |
| 13   | 100110  |
| 14   | 101001  |
| 15   | 101010  |
| 16   | 101100  |
| 17   | 110001  |
| 18   | 110010  |
| 19   | 110100  |
| 20   | 111000  |

The discriminator words used in the examples described above and shown in the figures, and discriminator words for other networks having different numbers of nodes, may be determined by inspection. For example, the decision logic for node 7 (address 010110) illustrated in FIG. 6g is derived as follows: (i) inspect the table of node addresses and identify distinct and distinguishing features of addresses of nodes above and below node 7 (i.e. how are the addresses of nodes 1 to 6 clearly distinguishable from the addresses of nodes 8 to 20?); then (ii) devise the minimum number of tests based on operations of the type A⊠B that discriminate on the basis of these distinguishing features. In this example, the addresses A of nodes 1 to 6 are distinct from nodes 8 to 20 in that they (a) begin with 00 (and therefore A⊠110000=0) or (b) they began with 010 (and therefore A⊠101000=0). Conversely the addresses of 8 to 20 do not begin with 00 or 010 so A⊠110000=1 and A⊠101000=1. The decision logic for node 7 therefore applies these tests to the header H of the outgoing packets to determine the correct direction for onwards propagation.

Each operation A⊠B requires just one optical AND gate, and as seen in the above example as few as 2 (or exceptionally 3) operations of this type are required to handle 20 6-bit node addresses.

FIG. 7 shows one example of a decision logic unit using optical hardware to perform the operation H⊠W where H is the address field (or a portion of it) in the header of an incoming packet, and W is a discriminator word. The operation H⊠W is performed by the optical AND gate referenced 72, together with the photodetector and electronic threshold detector that follows it. This optical AND gate 72 is an ultrafast device that produces a short optical pulse of picosecond duration at its output whenever a short pulse is incident simultaneously at each of its two inputs. A suitable example, is the semiconductor optical AND gate using four wave mixing (FWM) described and claimed in our co-pending European application no. 94307188.6. (BT reference A24802) and is disclosed in WO/94/21088. The response of the photodetector does not need to be ultrafast, but is fast enough to respond at the packet rate (typically 0.1–1 GHz). The electronic threshold detector is set to produce an output corresponding to the logical value H⊠W=1 if the input signal indicates that the photodetector has picked up at least one output pulse from the AND gate 72 simultaneously with the arrival of an incoming packet. If the photodetector does not pick up any output pulse when a packet arrives, this indicates that H⊠W=0. The word W is created by generating a clock pulse in precise synchronism with the incoming packet and then replicating this clock pulse as necessary to create the discriminator word W. If the word W is a simple one involving just one or two optical pulses, then it may be sufficient to replicate using fibre couplers and appropriate lengths of optical fibre. For more complex words W it may be preferable to use a silica planar delay line device such as described by C. J. Beaumont et al in BTTJ 9, 30–36, 1991. Suitable methods for generating the clock pulse in synchronism with the packet are described in detail in our co-pending International application filed this day entitled 'Packet Processing', Agents ref. 80/4850/03. The method adopted in the circuit of FIG. 7 uses a bit-asynchronous marker pulse associated with the header of the input packet. This is input to an ultrafast optical AND gate 71 with one of the inputs to the AND gate passing through a delay line tuned to the bit-asynchronous time difference between the marker pulse and a first bit of the header, which is always set to have the value 1. This marker pulse and set leading bit are separate from the words H making the header address operated upon in the address detection and routing decision stages. As shown in FIG. 7, the clock pulse output from the optical AND gate 71, is also picked up by a second photodetector and the resulting electrical pulse used as a synchronising signal for the threshold detector electronics. This optional feature serves to improve the signal-to-noise performance of the threshold detector by allowing the circuit to be gated or enabled for a short time period in synchronism with the incoming packet.

FIG. 7 shows a decision unit for the simplest case where there is a single operation of the form H⊠W to be carried out. As seen in the logic diagrams of FIGS. 5 and 6, sometimes the decision unit requires two or more such operations. In these cases one AND gate is provided for each of the H⊠W operations, and simple digital electronic circuitry is used to complete the logic operations specified in the decision logic diagram.

Figure 8:
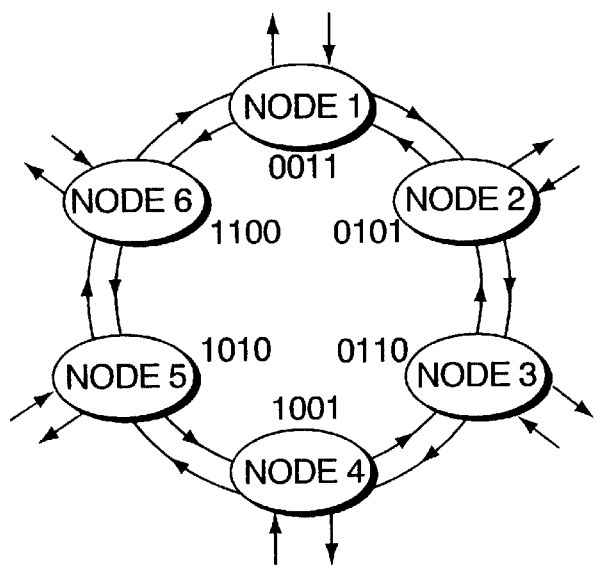
FIG. 8 shows a 6-node ring network.
Figure 9A:
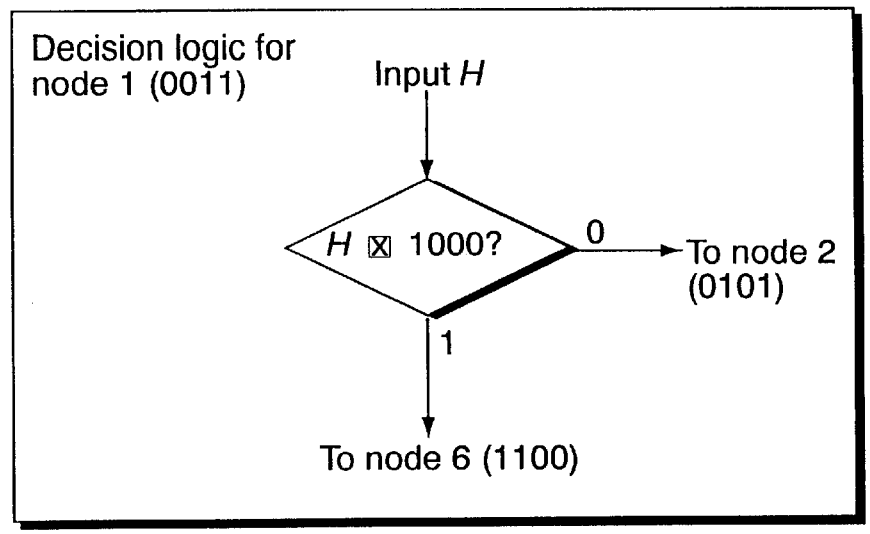
FIGS. 9a and 9b are logic diagrams for nodes 1 and 6 of the network of FIG. 8.
Figure 9B:
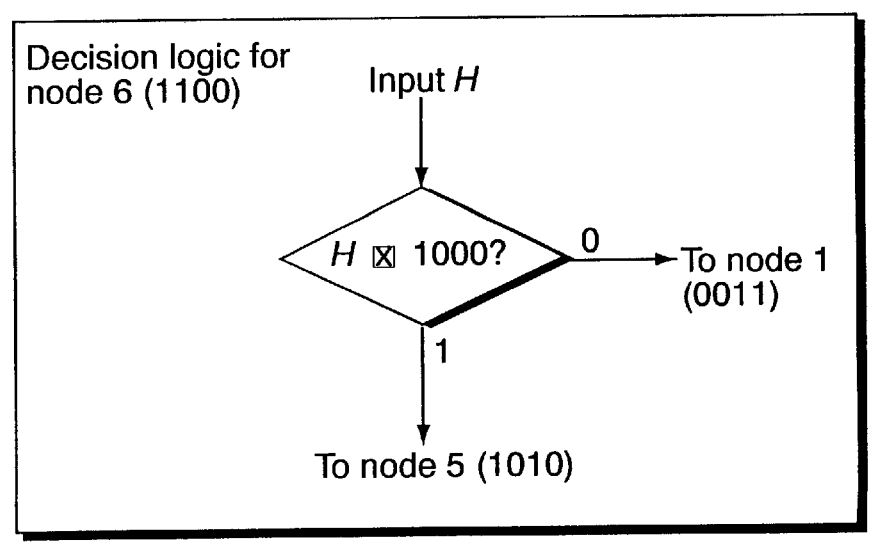

Although the examples so far described have used a dual bus network, the present invention is by no means limited in this respect and may be used with a variety of different topologies. FIG. 8 shows how a dual bus can be transformed into a ring network by joining the ends. The example shown is for a network with 6 nodes and 4-bit addresses. The required decision logic is identical to that shown in FIG. 4, except that decision logic is now required for nodes 1 and 6, as shown in FIGS. 9a and 9b respectively.

Figure 10:
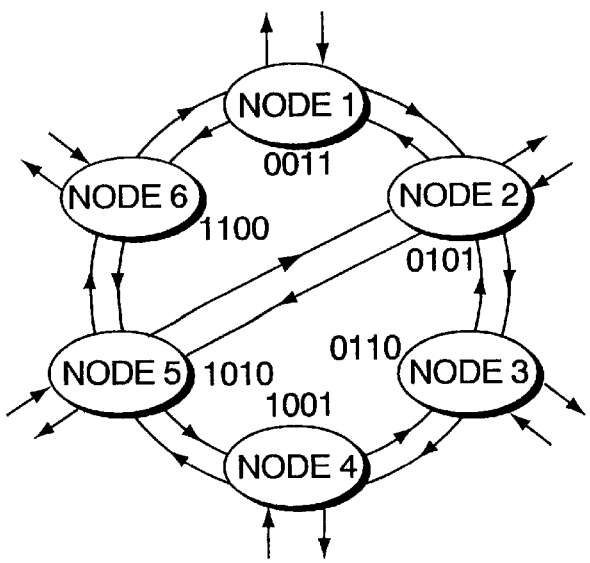
FIG. 10 shows a 6-node ring network including a cross-link between nodes 2 and 5.
Figure 11A:
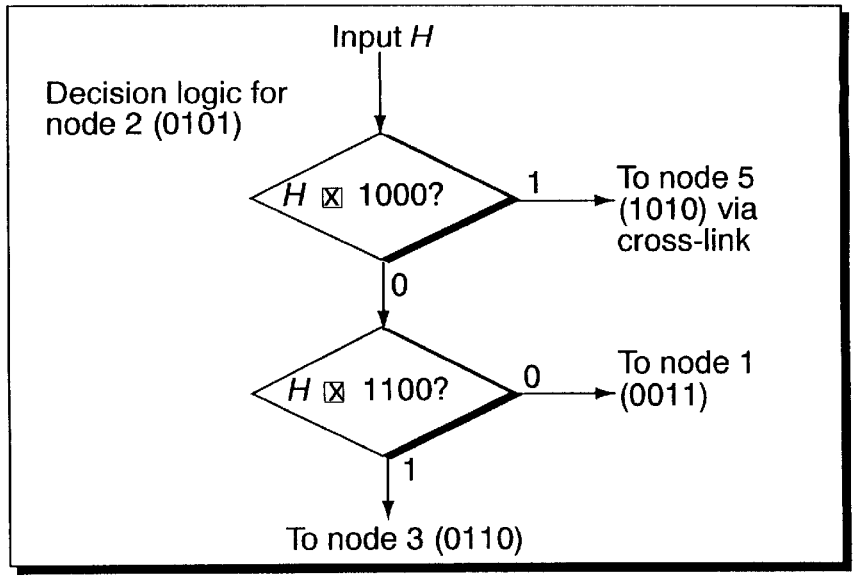
FIGS. 11a and 11b are logic diagrams showing the modified decision logic for nodes 2 and 5.
Figure 11B:
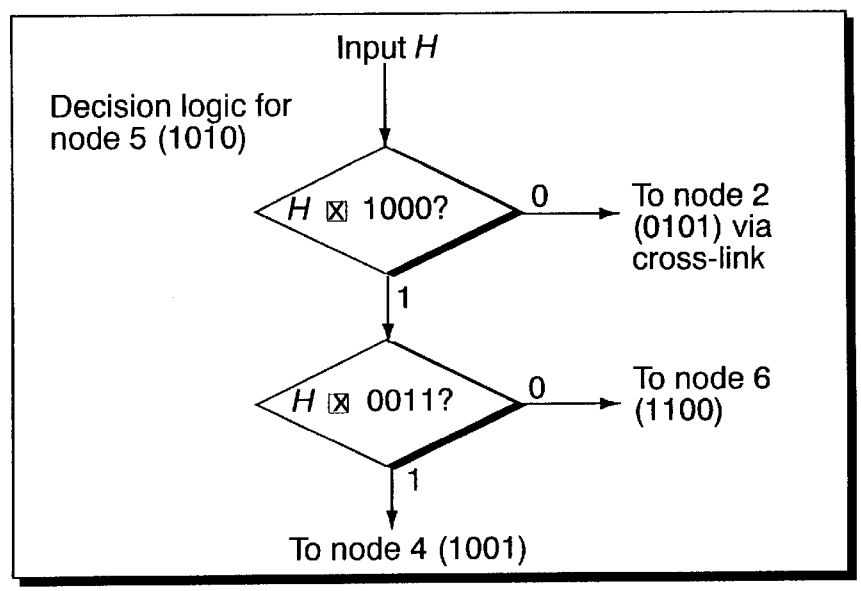

Suppose we have a dual bus or dual ring architecture and that the decision logic unit in a node determines that a particular packet is addressed to somewhere far distant along the bus. Then rather than sending the packet off on its way laboriously step-by-step along the bus, it would be more effective to steer the packet directly onto a "short-circuit" link connecting to a position further along the bus and thus bringing the packet more quickly towards its destination. Similarly, if we have a ring architecture and a node in the ring determines that a packet is addressed to somewhere on the far side of the ring then it would be more effective to steer the packet directly onto a link connecting opposite sides of the ring. This is illustrated in FIG. 10, which shows the ring network of FIG. 8, but with a cross-link between nodes 2 and 5. In this case, the decision logic for nodes 2 and 5, although still using the same principles and binary steering methods, must be modified to allow the selection of 1 from 3 possible outgoing routes. The appropriately modified decision logic for nodes 2 and 5 is shown in FIGS. 11a and 11b respectively. We can demonstrate the effect on the traffic of introducing this cross-link by counting up the number of hops (that is links between nodes) that a packet would have to make with and without the presence of the cross-links. As a simple example, the table below is for the case of packets leaving node 2 in the network of FIG. 10, depending on the ultimate destination of the packet.

| Destination node | Number of hops | |
| --- | --- | --- |
| | Without crosslink | With crosslink |
| 1 | 1 | 1 |
| 2 | — | — |
| 3 | 1 | 1 |
| 4 | 2 | 2 |
| 5 | 3 | 1 |
| 6 | 2 | 2 |

There is a reduction in the number of hops for traffic destined for node 5. This has the effect of reducing the traffic load on some of the links. However, the redistribution of traffic will be more effective if we also change the decision logic for adjacent nodes. FIG. 12 shows a modified decision logic diagram for node 3, but has the effect of moving more of the traffic leaving node 3 onto the cross-link between nodes 2 and 5.

In the examples so far described, the decision logic discussed has all been deterministic in nature. However, depending on the traffic loads in the network, some reconfiguration of the decision logic is desirable in order to distribute the traffic loads more evenly and to avoid hot spots. For example, in the case of node 3 in the ring network with cross-linking shown in FIG. 10, it is possible to reconfigure the decision logic diagram from the form shown in FIG. 4b to the form shown in FIG. 12. This can be done using electrically-controlled optical switches to bring in different logic units or sub-units. In this example, an optical switch could be used to bypass the first decision gate as shown by the dashed line in FIG. 12. This switch-over may be controlled by a central network management system. Alternatively, or in addition, in a network that has some in-built intelligence at the nodes, route selection may be a dynamic process that depends on instantaneous local traffic loads, as described for example in EP-A-465 090.

We now consider how the ultrafast optical packet routing techniques described in the above examples can be extrapolated to provide an implementation for a large-scale network with more irregular geometry. In the simple dual bus or dual ring network, the amount of cross-linking can be gradually increased so that the system moves towards a more highly interconnected mesh. However, this tends to produce a corresponding increase in the complexity of the address routing and decision logic. Not only does this add undesirably to the complexity of the optical and other hardware, but the network then becomes increasingly inflexible. It may for example be increasingly difficult to add additional nodes without having to reconfigure the decision logic for many adjacent nodes.

A network which is scalable without these penalties can be achieved by using a network hierarchy corresponding to different segments of the address field in the packet header. One example of an appropriate structure for the address header is shown in FIG. 13. In this figure, the marker pulse and first header bit are used only for clock synchronisation purposes, and are not relevant to the routing/decision logic. The remainder of the header may be divided into two or more address sub-fields as shown. Each of the sub-fields is a binary word preferably chosen from the special sub-set of binary words defined above. This allows each individual sub-field to be recognised and processed optically using simple optical AND operations in the manner described above. A further preferred constraint is that the complete address taking all the sub-fields together should also be a word from the same sub-set of all possible-binary words. If the sub-fields are all words composed of an even number of bits, then this additional constraint on the entire header is automatically met. If however more than one of the sub-fields are composed of an odd number of bits, then care must be taken to select the coding scheme for each of those sub-fields (using either i+1 ones and i−1 zeros, or the converse) to ensure that the complete address satisfies the coding requirements.

This scheme allows us to introduce a hierarchy of address domains within the overall network so that there is a relatively small number of distinct addresses within each domain. The address of a domain in each successive level in the hierarchy is represented by a corresponding address sub-field. (This can be likened to the different lines of the address on a letter in the postal system—the name of the county, town, street and so on).

Figure 14:
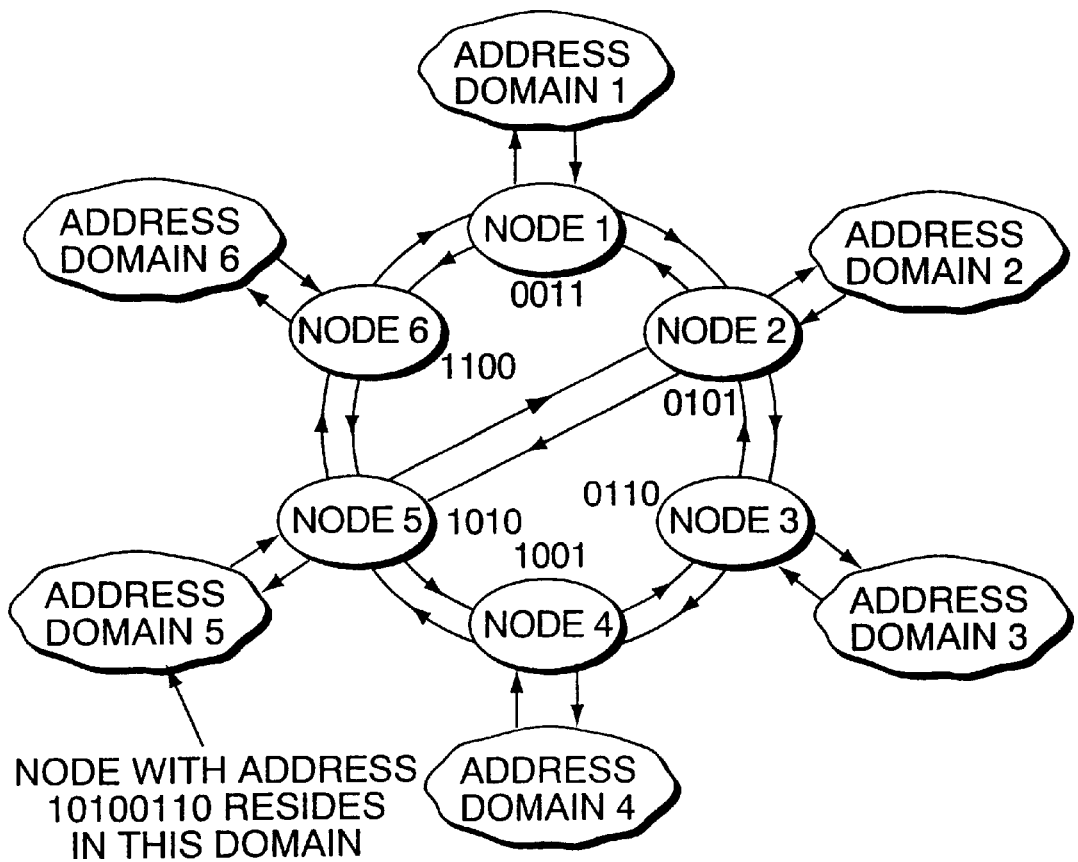
FIG. 14 shows a two-tier cross-linked ring network having six address domains.

FIG. 14 shows an example of a two-tier network in which there are six address domains interconnected by the cross-linked ring network of FIG. 10. A node with the address 10100110 could reside in the address domain number 5. The address is divided into two 4-bit sub-fields. The first sub-field (1010) represents the address of node 5 in the ring. The second sub-field (0110) is the address of the node within the address domain 5. The table below gives examples of the number of distinct addresses that can be accommodated for different lengths of the address (excluding marker and timing bits etc).

| Length of address field | Number and size of sub-fields | Number of distinct addresses |
| --- | --- | --- |
| 8 bits | Two 4-bits | 6 × 6 = 36 |
| 10 bits | Two 5-bits | 10 × 10 = 100 |
| 12 bits | Two 6-bits | 20 × 20 = 400 |
| 16 bits | Two 6-bits, one 4-bits | 20 × 20 × 6 = 2400 |
| 18 bits | Three 6-bits | 20 × 20 × 20 = 8000 |

Each of the addressed ultrafast packet nodes or "feeders" in the outer tier of the network, such as the node with address 10100110 may be connected to a large number of customers via conventional circuit-switched channels. The overall network capacity is given by the product of the feeder capacity and the number of feeders. For example, 2400 feeders (using 16-bit addresses) might serve a national network, providing 60 feeders at each of 40 major population centres. Each feeder might operate at ~30 Gbit/s payload capacity (100 Gbit/s peak line rate and 50% traffic load, taking into account time guard bands and other overheads). The overall network capacity is then ~2400×30 Gbit/s=72 Tbit/s. At any instant, this is sufficient to serve around 750,000 customers at an average of 100 Mbit/s (or 7.5 million customers with 10% instantaneous network utilisation per customer). In this example, each of the population centres would be served by 60 optical fibres, or fewer fibres combined with a modest amount of wavelength-division multiplexing.

One characteristic of this aspect of the present invention is that the number of distinct logic operations needed to make a routing decision is significantly less than the number of bits in the addresses. Table LO1 below illustrates this for 3-bit addresses. This extends Tables 1 and 2 above.

TABLE LO1

| Node | Address | No of logic operations |
| --- | --- | --- |
| 1 | 001 or 011 | 0 |
| 2 | 010 or 101 | 1 |
| 3 | 100 or 110 | 0 |
|  |  | Average = 0.33 |

Next for the case of nodes with 4-bit addresses. This extends Table 3 above using FIG. 4.

TABLE LO2

| Node | Address | No of logic operations |
| --- | --- | --- |
| 1 | 0011 | 0 |
| 2 | 0101 | 1 |
| 3 | 0110 | 1 |
| 4 | 1001 | 1 |
| 5 | 1010 | 1 |
| 6 | 1100 | o |
|  |  | Average = 0.66 |

Next for the case of nodes with 5-bit addresses. This extends Table 4 from above using FIG. 5.

TABLE LO3

| Node | Address | No of logic operations |
| --- | --- | --- |
| 1 | 00011 | 0 |
| 2 | 00101 | 1 |
| 3 | 00110 | 1 |
| 4 | 01001 | 1 |
| 5 | 01010 | 2 |
| 6 | 01100 | 1 |
| 7 | 10001 | 1 |
| 8 | 10010 | 2 |
| 9 | 10100 | 1 |
| 10 | 11000 | 0 |
|  |  | Average = 1.0 |

Next for the case of nodes with 6-bit addresses. This extends Table 5 above using FIG. 6.

TABLE LO4

| Node | Address | No of logic operations |
| --- | --- | --- |
| 1 | 000111 | 0 |
| 2 | 001011 | 1 |
| 3 | 001101 | 2 |
| 4 | 001110 | 1 |
| 5 | 010011 | 1 |
| 6 | 010101 | 2 |
| 7 | 010110 | 2 |
| 8 | 011001 | 2 |
| 9 | 011010 | 2 |
| 10 | 011100 | 1 |
| 11 | 100011 | 1 |
| 12 | 100101 | 2 |
| 13 | 100110 | 2 |
| 14 | 101001 | 2 |
| 15 | 101010 | 3 |
| 16 | 101100 | 2 |
| 17 | 110001 | 2 |
| 18 | 110010 | 2 |
| 19 | 110100 | 1 |

TABLE L04-continued

| Node | Address | No of logic operations |
|---|---|---|
| 20 | 111000 | 0 |
| | | Average = 1.55 |

The routing method of the present invention offers significant advantages with 2-connected networks, and in particular with a novel picket-fence topology developed by the present inventors and described in further detail below.

Picket Fence Networks

Figure 21:
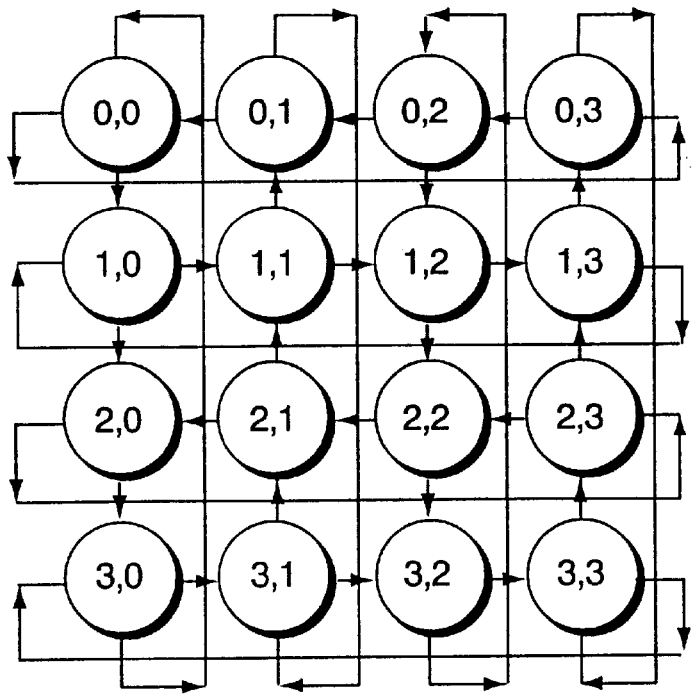
FIG. 21 shows a Manhattan Street (MS) network topology.

The inventors have devised a new design of network that has significant advantages for ultrafast packet transmission compared to previous designs. It is a 'two-connected' network with nodes connected in the form of a picket fence. In a 'two-connected' network all the nodes have two inputs and two outputs. Probably the best-known example is the Manhattan Street (MS) Network [N. F. Maxemchuk, "Regular and mesh topologies in local and metropolitan are networks" AT&T Tech. J. vol 64, pp 1659–1686 (September 1985), in which the links are arranged in a structure that resembles the streets and avenues in Manhattan (FIG. 21). The MS network is formed by joining together the two ends of each row and column to create a toroidal structure. The MS network is well suited as a self-routing packet network because there are many alternative routings between any pair of nodes, so that contention within the network can be resolved readily by deflecting packets along different routes. The nodes in the network determine the optimum onward path for packets in transit by using 'routing rules' or algorithms. However the routing rules for the MS network ["Routing in the Manhattan Street Network" IEEE Trans on Communications vol COM-35 no. 5, pp 504–512 (May 1987)] require the nodes to determine the full destination address of each packet in transit.

We are interested in developing optical packet networks that can operate at very high speed, with the bit-level processing in the network nodes carried out in the optical domain. We therefore need to devise networks that can operate with very simple routing rules to minimise the complexity of optical hardware. For example, the routing rules for the MS network would require serial-to-parallel conversion of the full packet headers at ultrafast speed. We would prefer a routing rule based on logic operations of the type H×W. We have therefore devised a new network design (called the 'Picket Fence' network).

Like the MS network, the links in the Picket Fence (PF) network are arranged in a structure that resembles the streets and avenues in Manhattan. However, whilst the MS network is formed by joining together the two ends of each row and column, the PF network is formed by connecting the ends of adjacent rows or columns so as to form bidirectional links at the periphery of the network.

Figure 22:
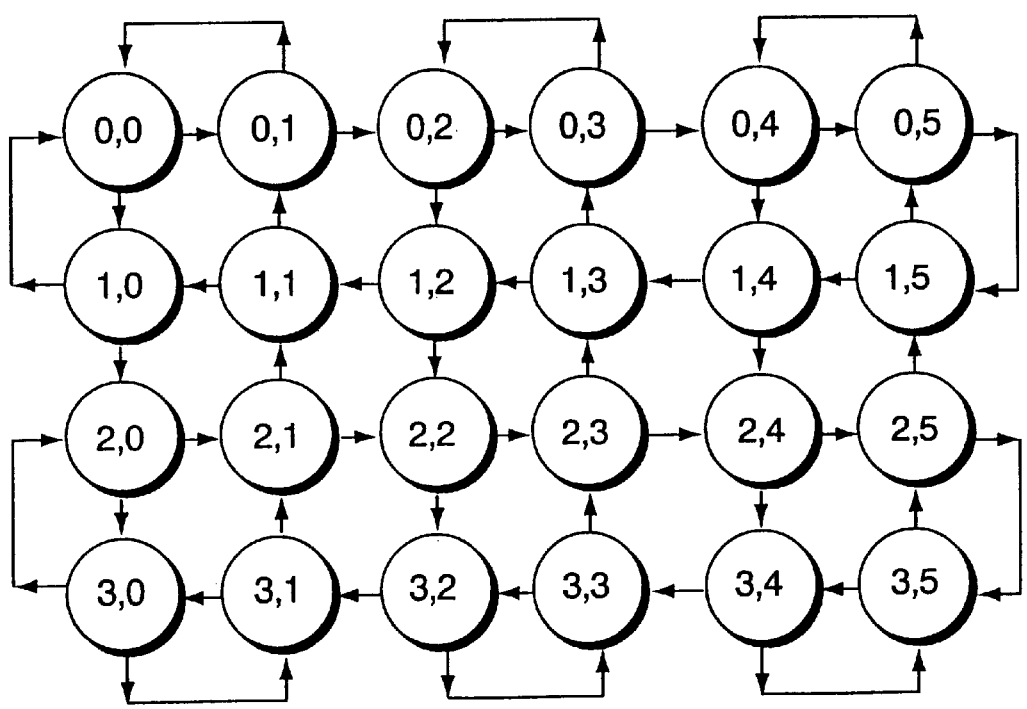
FIG. 22 shows a picket fence (PF) topology.
Figure 23:
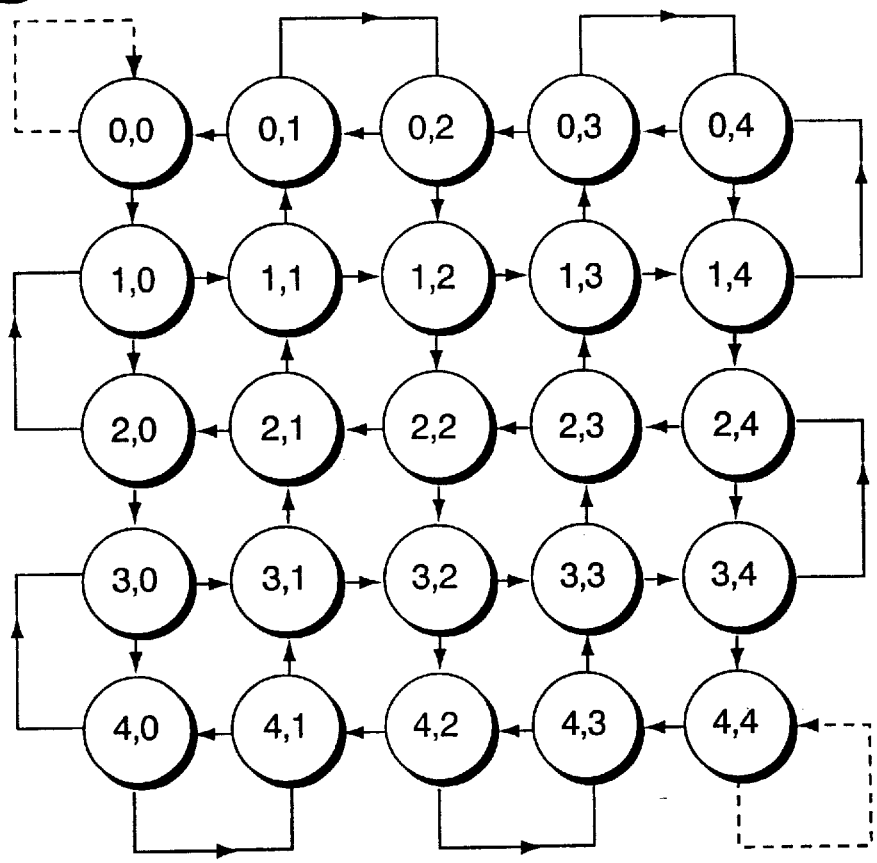
FIG. 23 shows a close-woven PF topology.

In the form shown in FIG. 22, the network resembles a picket fence, hence the name. Another example, shown in FIG. 23, could be given the name 'Close Woven' network because it resembles a fabric woven from a single continuous thread. At present we use the term 'PF Network' for all two-connected networks with nodes on a rectangular grid with the ends of adjacent rows or columns connected so as to form bidirectional links at the periphery of the network.

The attraction of these PF networks is that efficient routing rules can be devised that do not require the nodes to determine the full destination address of packets in transit.

The simplest routing rule is as follows:

Select the preferred path if there is one preferred path from a node.

Select either path at random if there are zero or two preferred paths from a node.

A preferred path is one which is in a direct line towards the cell destination or lies on the border of the quadrant in which the destination is situated. A path which is a direct line away from the cell destination is never preferred.

The rule can be implemented by determining only the signs of $\Delta R = R - R_{DEST}$ and $\Delta C = C - C_{DEST}$, where R and C are the row and column coordinates of the current node, $R_{DEST}$ and $C_{DEST}$ are the row and column coordinates of the destination node. From the signs of $\Delta R$ and $\Delta C$, the quadrant in which the cell destination is situated (relative to the current routing node) and thus the preferred path can be determined. It is not necessary to know the precise destination address, nor the configuration of the destination node, nor the size of the network or other global parameters.

The signs of $\Delta R$ and $\Delta C$ can be determined optically for ultrafast optical packets using the methods described above. The examples worked out above describe logic operations (using 'discriminator words') to determine the preferred direction of onward propagation for a packet in a dual bus network. In effect the logic operations are used to determine whether the destination address of the packet is less than or greater than the address of the current switching node. This is equivalent to determining the sign of relative address of the destination node compared to the current node (i.e. equivalent to determining the sign of $\Delta R$ and $\Delta C$ in a 2-D network). Therefore in the two-dimensional 'Picket Fence' network the same technique can be used twice at the switching node (once to determine the relative position of the destination node in the row direction using the portion of the packet address field that indicates the row number of the destination address, and once to determine the relative position of the destination node in the column direction using the portion of the packet address field that indicates the column number of the destination address). The routing rules are set out in the table "PF Routing" below.

We have carried out extensive numerical performance modelling of PF networks (using the Opnet modelling tool). We have determined the efficiency of this basic routing rule and also other slightly more complex variants. The results of these simulations indicate that the routing efficiency is good, quite comparable to the well-known Ms network, even though the routing rule itself is more simple and easier to implement in ultrafast optics. Moreover when the 'hot potato' routing strategy is used (i.e. no buffering of packets at the routing nodes) in simulations of traffic flow in these networks, the traffic throughputs of the PF and MS networks are quite comparable. This is an important result because buffering in the optical domain is difficult and to be avoided. However the simulations have also highlighted that relative performance of the PF network is best when traffic loadings are not too high.

Hybrid Synchronisation

As discussed in the introduction above, for ultrafast packet networks, there is a key design problem of maintaining synchronisation.

For ultrafast packet networks we propose a "hybrid" synchronisation scheme, comprising a combination of: i) a continuous, global network clock providing packet-level time information (the precision being equivalent to many bit periods); ii) localised, packet-specific time information (with precision at the bit level).

This proposal arises from our realisation that in ultrafast packet networks, timing information is needed for various purposes on two different time scales: the bit-level time scale (with precision typically a few picoseconds or less for packet networks operating at an instantaneous bit rate of 100 Gbit/s or greater) and a packet-level time scale (with precision typically several bit periods, 50–100 picoseconds, for packet lengths on the order of 1–10 nanoseconds). The ultrafast (picosecond) timing information is needed for localised (packet-specific) optical bit-level processes such as header address recognition, self-routing decisions, and demultiplexing; whereas global (network-wide) synchronisation at the packet level is used to define packet time slots. The main purpose of the global network clock is to ensure that packets are properly separated in time so as to avoid collisions and also so as to allow sufficient time for optoelectronic routing switches to operate without corrupting packets in transit. As explained later, this global, packet-level clock can have other useful purposes: for example, to ensure correct time synchronisation of routing switches throughout the network, to provide signal gating and noise reduction.

We consider it would be very difficult to satisfy these various synchronisation requirements using a single (non-hybrid) scheme to provide a global clock with bit-level timing precision. This is because in an ultrafast packet network it would be extremely difficult to distribute a clock with bit-level (i.e. picosecond) timing precision and ensure that all the packets and switching equipment throughout the network are at all times precisely synchronised to that clock. This is because at 100 Gbit/s, for example, the bit period is 10 picoseconds, equivalent to a path length in fibre of just 2 mm. As already mentioned, in OTDM networks a global bit-level clock can be distributed effectively with very good precision, despite network path-length variations. This is because: i) the circuit routings are fixed (except for infrequent reconfiguration under manual or network management control); and ii) the bit streams are continuous and therefore clock recovery methods based on phase-locked loops can be used. In a packet network, however, this is much less practical. Successive packets on a given link may have originated from different sources and have travelled along widely differing physical paths before reaching that link, and therefore have been subjected to very different transit-time variations.

Figure 16:
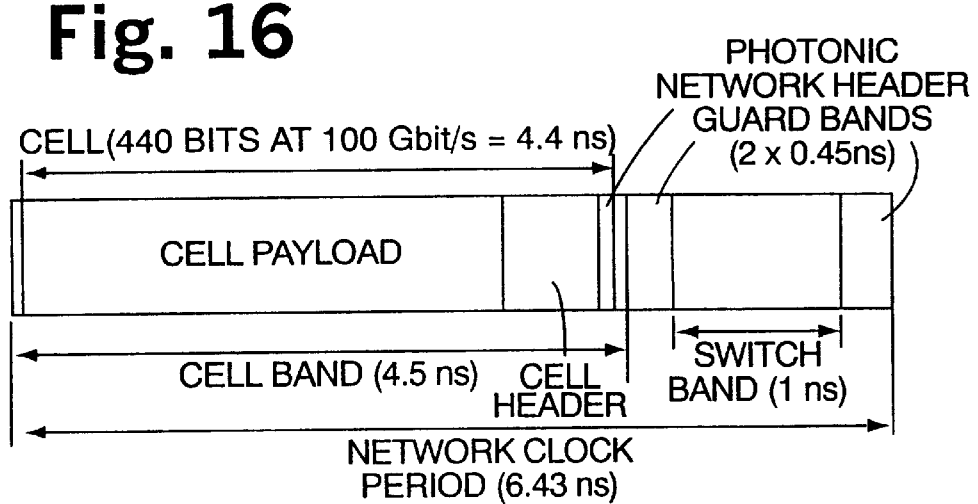
FIG. 16 shows a network time slot.

The synchronisation scheme we have developed for ultrafast packet networks is therefore a "hybrid" solution. We combine localised fine-grain (bit-level) timing extraction on a packet-by-packet basis together with global coarse-grain (packet-level) timing. FIG. 16 shows, by way of example, a timing diagram for the time slots in an ultrafast packet network. This diagram illustrates the relationship between the bit-level and packet-level time references. The network clock provides only coarse network synchronisation at the packet level. The network is thus slotted in time and space, at the clock frequency, with a maximum of one cell occupying each slot. In the example shown in FIG. 16, the time partitioning within the time slot has been dimensioned to accommodate standard ATM cells. The network clock has been chosen to be one of the standard SDH rates. The cell consists of a burst of ultrashort optical pulses representing about 440 bits (the 53-byte ATM cell plus around 10–20 additional header bits to allow routing of the cell in the ultrafast optical packet network) at an instantaneous rate of 100 Gbit/s. Notice that the position of the cell within its time slot is not defined with bit-level precision; instead there is a timing tolerance egual to several bit periods (around 100 picoseconds or 10 bit periods in this example). The network time slot also contains a switch band, allowing time for the reconfiguration of routing switches, and time guard bands. It is necessary for this switch band to be equivalent to many bit periods. For example, typical routing switches (lithium niobate devices such as type Y-35-8772-02 supplied by GEC Advanced Components, or 2×2 integrated InP semiconductor of the type described by G Sherlock et al in Electronics Letters 30, 137–138, 1994) are capable of switching configuration in a time of ~1 ns. Therefore for cells with an instantaneous bit rate of 100 Gbit/s, a 1 ns switch band is eguivalent to 100 bit periods.

Figure 24:
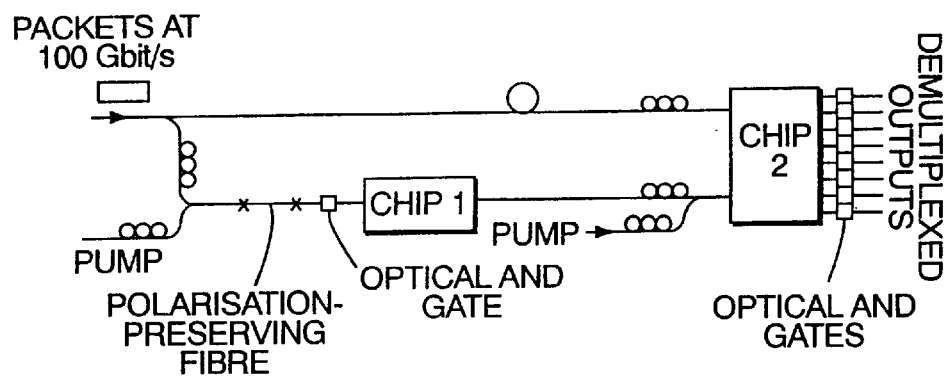
FIG. 24 shows a clock-recovery/demultiplexer circuit.

For the reasons described earlier, it is necessary to obtain bit-level timing information on a packet-by-packet basis. Several ways of doing this are discussed in our co-pending International application entitled "Packet Processing" (ref: 80/4850/03), the contents of which are incorporated herein by reference. For example, FIG. 24, corresponding to FIG. 7 of that copending application shows a circuit which recovers a bit-level clock from a marker pulse carried with the packet, and uses that clock in a demultiplexer. In this implementation the AND gate is a semiconductor laser amplifier. The original and delayed versions of the packet input to the AND gate interact in the SLA by a process of four wave mixing (FWM). Independent polarisation controllers such as BT&D MPC1000 are provided in two input branches to the AND gate. The fixed delay is provided by a length of polarisation preserving fibre. The length of the fibre is chosen so that group delay difference for the two polarisation eigenmodes of the fibre equals the required delay 1.5 T, corresponding to the time-offset of the marker pulse carried by the packet, For typical polarisation-preserving fibre, such as high-birefringence fibre type HB1500 manufactured by Fibercore Limited of Chandlers Ford, Hampshire, England, specified as having a beat length of less than 2 mm and with packets at a bit rate of 100 Gbit/s, the length required is less than 30 m, giving a delay of 15 ps. The polarisation state of the incoming packet is set to be linear, aligned at 45° to the fibre polarisation axis. This splits the signal into two orthogonally polarised components that emerge from the fibre with the required 15 ps time difference. These two orthogonally-polarised time-shifted components provide the input signals to the optical AND gate. The AND gate requires pump light which is coupled into the polarisation-preserving fibre through a second input branch with an appropriate polarisation.

It is found that with such an AND gate, sharp filtering is required on the output to separate the AND signal from other features of the output. This however can lead to an undesirable broadening in the output pulse profile. To avoid this, the output is preferably filtered using an ultra-steep edge high rejection fibre Bragg grating filter. Such a grating may be fabricated, for example, in hydrogen loaded (200 Bar) standard telecommunications fibre (Phillips matched-clad) with a nominal core-cladding index difference of $4.5 \times 10^{-3}$. A 4 mm long grating may be replicated using an interferomoneter based on a rectangular silica block and phase mask, as described in Kashyap R, "Photosensitive optical fibres: Devices and Applications", Opt. Fibre Technol., 1(1), 17–34, 1994. One such filter can give extinctions greater than 64 dB and edge widths less than 1 nm, and two such filters cascaded with an interposed isolator can give better than 74 dB rejection.

Other methods of distinguishing the marker pulse from the rest of the data packet include the use of a distinctive intensity, or polarisation . The circuits referenced chip 1 and chip 2 use planar silica delay lines to replicate the marker pulse thereby producing a bit-level clock which is input to the AND gates of the demultiplexer.

Reference to the packet-level network clock will also be essential at positions in the network where packets are generated, and as described below it will also be desirable at positions where packets are routed or processed in other ways. Preferably the packet-level network clock could be derived from adjacent telecommunications equipment that already has access to a suitable distributed clock with sub-nanosecond precision, such as SDH optical line terminations, multiplexers or cross-point switches.

Figure 17:
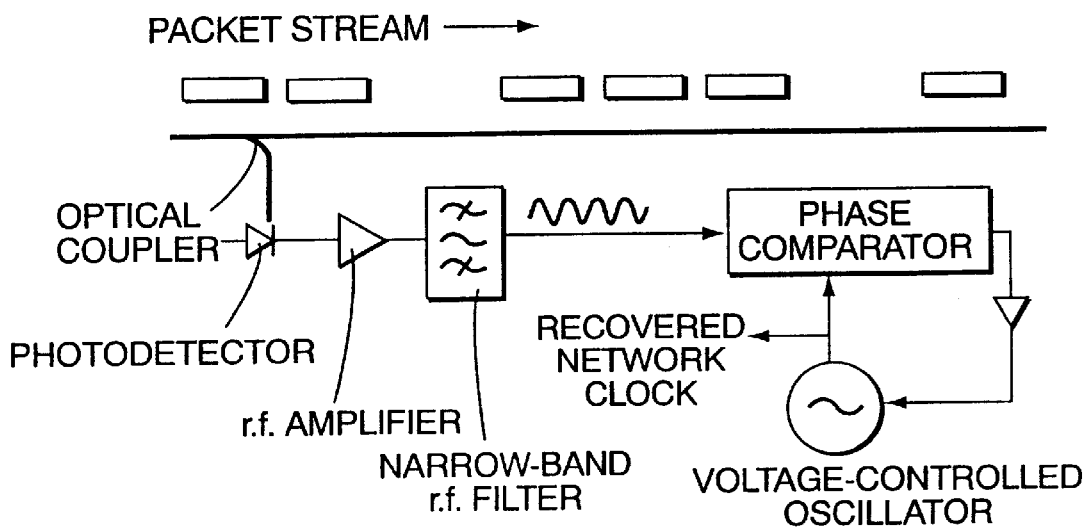
FIG. 17 shows a circuit for recovery of a packet-level clock.

Alternatively the clock could be distributed using a separate optical fibre network, or by using a different wavelength on the same fibre. A further possibility is shown in FIG. 17, where the network clock is recovered directly from the incoming packet stream using an electrical phase-lock loop. The high-frequency response of the photodetector need not be any greater than the network clock frequency (typically 0.1–1 GHz). The photodetector output is amplified, a narrow-band r.f. filter is used to extract the r.f. component at the network clock frequency, and this signal is applied to the reference input of a r.f. phase comparator. The main input to the comparator is the signal from a voltage-controlled oscillator generating a signal at the network clock frequency. The output from the phase comparator is used as the error signal to drive the voltage-controlled oscillator. The electrical phase-locked loop bandwidth is set to ~1 Mz or less, sufficient to track typical phase fluctuations in the incoming packet stream.

Since, preferably, the network nodes will have access to the network clock, this can be used to simplify and improve the performance of packet processing and switching, as the three examples that follow will show.

Figure 18:
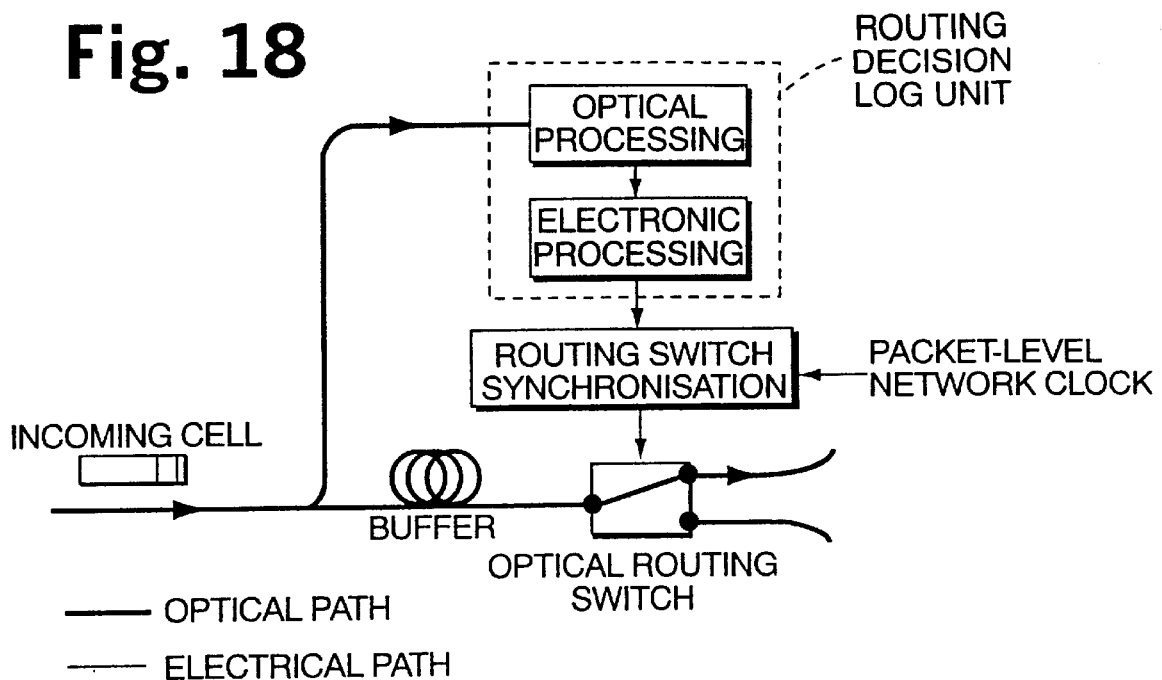
FIG. 18 shows a binary routing node.

The first example is shown in FIG. 18, which is an example of a binary routing node in an ultrafast packet network. An incoming cell is to be routed to one of the two output ports of an optoelectronic routing switch, according to information contained in the cell header. A replica of the cell is made using a passive optical splitter, and passed to the "routing decision logic unit" which contains both optical and electronic processing. The output from this logic unit is used to set the configuration of the routing switch. The buffer is used to delay the arrival of the cell until the optical routing switch has been correctly configured for that cell. It is essential that the routing switch changes configuration only during the "switch band" shown in FIG. 16—if not, a cell may be corrupted. Therefore the purpose of the "routing switch synchronisation" unit in FIG. 18 is to ensure that a signal from the decision logic unit will take effect only at the correct instant—i.e. at the start of the switch band. This is done by synchronising the routing switch drive signal to the appropriate phase point of the network clock. This can be achieved readily using conventional high-speed digital electronic circuitry.

Figure 19:
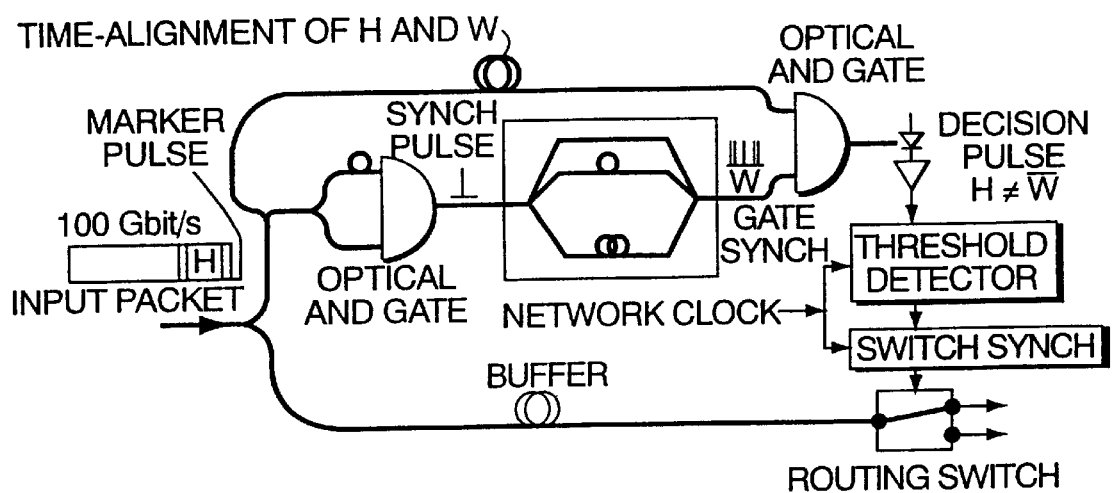
FIG. 19 shows in further detail the circuit of FIG. 18.

In the second example, the network clock is used in the electronic processing stage of the routing decision logic unit. FIG. 19 is a more detailed version of FIG. 18, showing an example of a binary routing node. The optical-processing part of the routing decision logic unit consists of: i) a first optical AND gate to derive a single ultrashort optical pulse (called the "synch pulse" in FIG. 4) in precise bit-level synchronism with the incoming packet (as described in our co-pending application ref: 80/4850/03) ii) a word-generation stage consisting of a passive optical split-delay-recombine circuit; iii) a second optical AND gate to perform a binary word-recognition operation. As described in PCT/GB 94/00397, a binary word mismatch (H not equal to $\overline{W}$) is represented by at least one optical output pulse from the second AND gate. This optical output is received by a photodetector whose electrical output signal (perhaps after amplification) is passed to a threshold detector. This threshold detector is arranged to produce a standardised electrical output pulse if the input from the photodetector exceeds a certain threshold. This threshold is set somewhat lower than the signal level corresponding to a single optical output pulse from the second AND gate, and somewhat higher than the noise background. To improve the signal-to-noise discrimination of this electronic threshold detector, it can be advantageous to gate its operation so that it is responsive only during that fraction of the network clock cycle in which a legitimate optical signal from the second AND gate might be received. As shown in FIG. 19, a net-work clock signal can be used to provide the synchronisation needed for this gate.

Figure 20:
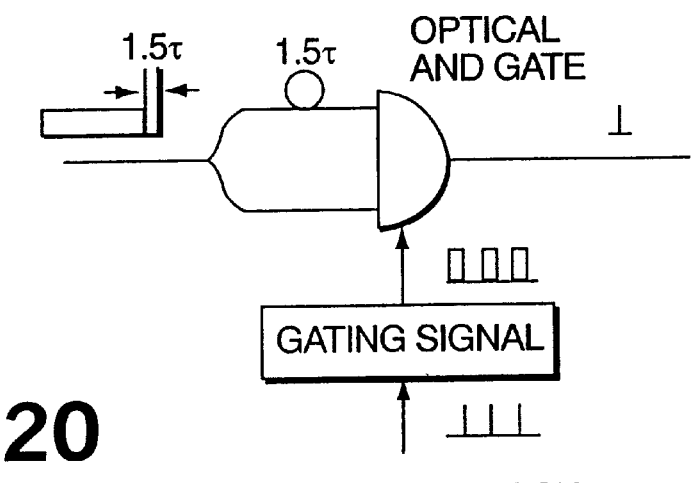
FIG. 20 shows an SLA AND gate gated by a network clock.

A third additional use of the network clock is to help improve signal-to-noise ratios in optical signal-processing systems. An example of this is given in FIG. 20 which shows the arrangement for bit-level timing recovery used in FIG. 19. In this example the optical AND gate is the device described by Nesset et al in our co-pending application, EP 94307188.6, and in WO94/21088, incorporated herein by reference, which uses a semiconductor optical amplifier as the nonlinear optical element. It is useful to be able to gate the operation of the semiconductor optical amplifier so that it is enabled during the time period in which the device is needed to perform a processing function (i.e. during the time when the "photonic network header" shown in FIG. 16 may be present), and is disabled during as much as possible of the remainder of the network time slot period. This has the advantage that any optical noise (such as amplified spontaneous emission) produced by the semiconductor optical amplifier will be suppressed during the major part of the time slot period, when the device is not performing a useful processing function. The optical AND gate and other optical processing systems also incorporate several doped-fibre optical amplifiers to amplify the various signals to the required levels, and other doped-fibre optical amplifiers will also be required throughout the packet network to compensate for losses in transmission and switching. These amplifiers all contribute noise due to amplified spontaneous emission, and therefore gating devices such as the semiconductor optical amplifier can help to control the build-up of noise levels in the network. The semiconductor optical amplifier in FIG. 20 can therefore perform two useful functions: ultrafast signal processing during the "enabled" period, and noise suppression during the "disabled" period. A relatively rapid turn-off time can be obtained with these semiconductor optical amplifiers (i.e. much faster than the carrier lifetime, typically ~1 ns) when used as the nonlinear element in an optical AND gate configuration; this is because we use a continuous optical "pump" signal which tends to deplete rapidly the optical gain when the electrical bias is turned off. Experimentally the turn-on and turn-off times for the semiconductor optical amplifier will be mainly determined by the speed of the electrical drive signals (typically ~0.1–1 ns). When turned off, the semiconductor optical amplifier acts as a very effective light absorber, typically giving an optical on:off intensity ratio as high as ~40 dB. Therefore, if the semiconductor optical amplifier is turned off for ~90% of the network clock period, the averaged optical noise suppression can be ~10 dB.

Above, we described possible methods for recovering the packet-level network clock at intermediate network nodes. Another possible approach is to generate an incomplete clock by deriving a timing signal from individual packets (e.g. the optical "synch pulse" shown in FIG. 19). This clock is incomplete because no signal is obtained when a time slot is unoccupied. This incomplete clock may be satisfactory for some purposes e.g. synchronisation of simple binary routing switches (satisfactory because a momentary loss of synchronisation may not matter if no packet is present). In general, however, the complete network clock may be needed to synchronise more complex routing switches (such as the packet-merging switch described in our co-pending application EP 94306015.2, incorporated herein by reference, page 8 and FIG. 15) and for gating active devices to improve noise immunity.

TABLE

FF ROUTING

| Current node Configuration | ΔR | ΔC | Preferred Path | Current Node configuration | ΔR | ΔC | Preferred Path |
|---|---|---|---|---|---|---|---|
| δR = +1 | <0 | <0 | random | δR = +1 | <0 | <0 | down |
| δC = +1 |  | 0 | down | δC = −1 |  | 0 | down |
|  |  | >0 | down |  |  | >0 | random |
|  | 0 | <0 | right |  | 0 | <0 | down |
|  |  | 0 | — |  |  | 0 | — |
|  |  | >0 | down |  |  | >0 | left |
|  | >0 | <0 | right |  | >0 | <0 | random |
|  |  | 0 | right |  |  | 0 | left |
|  |  | >0 | random |  |  | >0 | left |
| δR = −1 | <0 | <0 | right | δR = −1 | <0 | <0 | random |
| δC = +1 |  | 0 | right | δC = −1 |  | 0 | left |
|  |  | >0 | random |  |  | >0 | left |
|  | 0 | <0 | right |  | 0 | <0 | up |
|  |  | 0 | — |  |  | 0 | — |
|  |  | >0 | up |  |  | >0 | left |
|  | >0 | <0 | random |  | >0 | <0 | up |
|  |  | 0 | up |  |  | 0 | up |
|  |  | >0 | up |  |  | >0 | random |

What is claimed is:

1. An optical network comprising a plurality of routing nodes, each node comprising routing circuitry for routing packets on said optical network and each node having first and second inputs and first and second outputs, said plurality of nodes being organized as a matrix which includes alternating first and second rows and altering first and second columns such that the first output of the node at a first end of at least one first row is connected to the first input of the node at the same end of an adjacent second row, the first output of the node at a second end of at least one second row is connected to the first input of the node at the same end of an adjacent first row, the second output of the node at a first end of at least one first column is connected to the second input of the node at the same end of an adjacent second column, and the second output of the node at a second end of at least one second column is connected to the second input of the node at the same end of an adjacent first column.

2. An optical network according to claim 1, wherein the first output of the node at one corner of said matrix is connected to its own second input and the second output of the node at another corner of said matrix is connected to its own first input.

* * * * *